United States Patent [19]

Smith et al.

[11] 4,054,419

[45] Oct. 18, 1977

[54] APPARATUS FOR CONDUCTING CHEMICAL REACTIONS IN THE PRESENCE OF TWO OR MORE FLUID PHASES

[75] Inventors: Glen C. Smith; Frederick W. Sanders, both of Chillicothe, Ohio

[73] Assignee: The Mead Corporation, Dayton, Ohio

[21] Appl. No.: 517,246

[22] Filed: Oct. 23, 1974

Related U.S. Application Data

[63] Continuation of Ser. No. 356,469, May 2, 1973, abandoned, which is a continuation-in-part of Ser. No. 87,503, Nov. 6, 1970, abandoned.

[51] Int. Cl.$^2$ .......................... B01J 8/02; B01J 21/18; B01J 35/10
[52] U.S. Cl. .................. 23/288 A; 208/299; 423/DIG. 13
[58] Field of Search ............ 23/288 R, 52 A; 208/134, 143, 299; 423/DIG. 13

[56] References Cited

U.S. PATENT DOCUMENTS

| | | | |
|---|---|---|---|
| 2,000,815 | 5/1935 | Berl | 204/284 |
| 2,275,281 | 3/1942 | Berl | 204/284 |
| 2,415,531 | 2/1947 | Porter | 23/288 R |
| 2,479,451 | 8/1949 | Young | 252/477 R |
| 2,567,468 | 9/1951 | Berl | 252/444 |
| 2,722,504 | 11/1955 | Fleck | 208/110 |
| 2,877,099 | 3/1959 | Bowles | 23/288 R |
| 3,497,327 | 2/1970 | Kehse | 23/288 R |
| 3,509,203 | 4/1970 | Michaelis et al. | 23/288 R |
| 3,536,537 | 10/1970 | Solomon | 252/182.1 |
| 3,655,547 | 4/1972 | Lyons | 204/248 |
| 3,666,405 | 5/1972 | Winsel | 55/68 |
| 3,697,416 | 10/1972 | Carson et al. | 23/288 R |

FOREIGN PATENT DOCUMENTS

| | | | |
|---|---|---|---|
| 700,933 | 12/1964 | Canada | |
| 951,153 | 1947 | France | 23/288 S |

*Primary Examiner*—Morris O. Wolk
*Assistant Examiner*—Bradley Garris
*Attorney, Agent, or Firm*—Biebel, French & Nauman

[57] ABSTRACT

An improved reactor for chemical reaction includes a wetproofed catalyst therein for increasing the rate of reaction between the reactants and/or controlling selectivity of the products, if there is more than one reaction product. The wetproofed catalyst may be used in addition to the other catalytic systems already known in the art. The reaction occurs in the presence of two or more fluid phases. The types of reaction may be reduction-oxidation, hydration and the like. The wetproofed catalyst is a solid, particulate catalyst including surface portions which are wetproofed so that the catalyst is not flooded by any of the reactants, reaction products or other fluids in the reaction chamber. Wetproofing of the surface portions of the catalyst may be accomplished in various ways, as described, and various materials may be used for the catalyst. Reaction conditions may be subambient temperature and pressure, to elevated temperature and pressure and the reaction may be operated on a batch, batch continuous, or continuous basis. It is important that each reactant contact the catalyst and each other, but that neither reactant flood the catalyst. The reaction chamber is of relatively simple design because of the effectiveness of the wetproofed catalyst which need not be regenerated.

2 Claims, 10 Drawing Figures

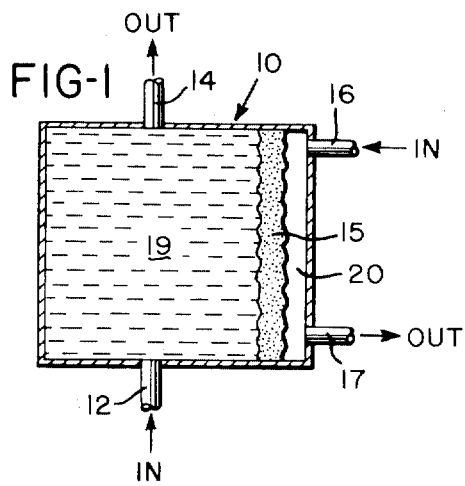
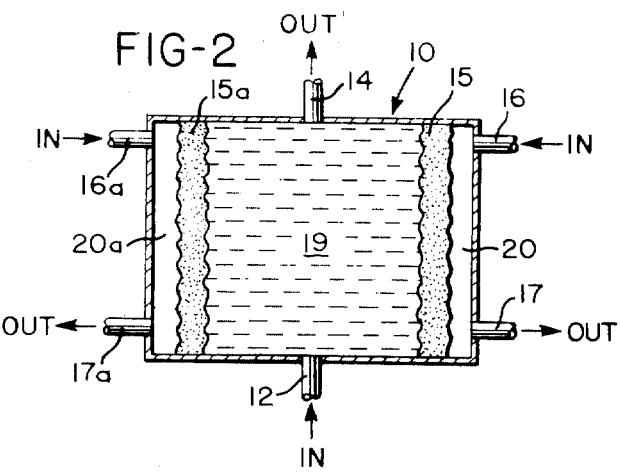
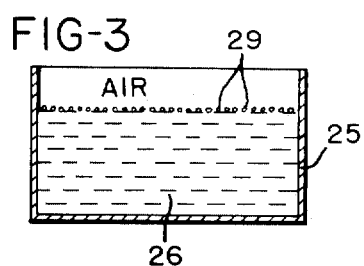
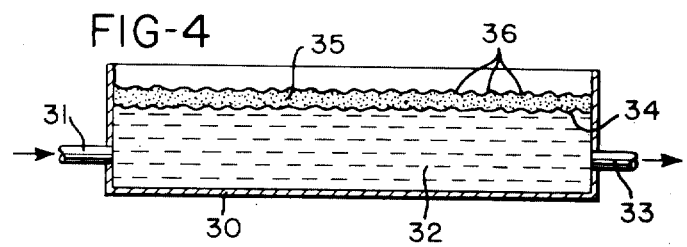
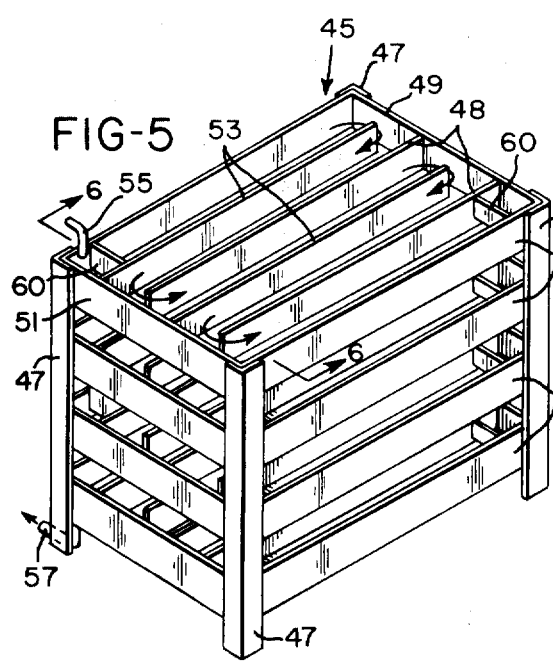
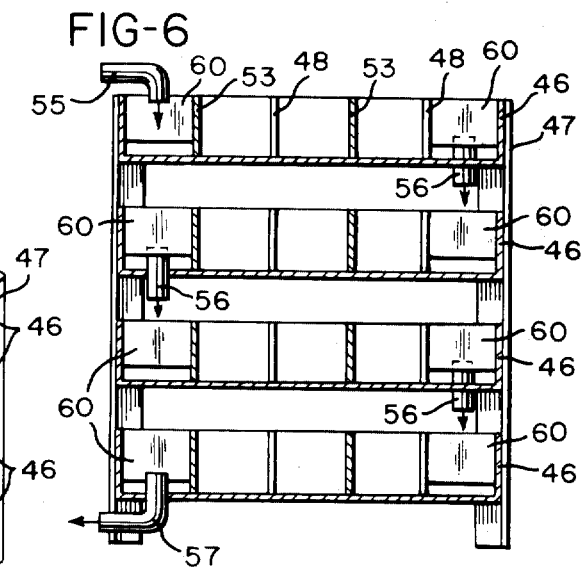

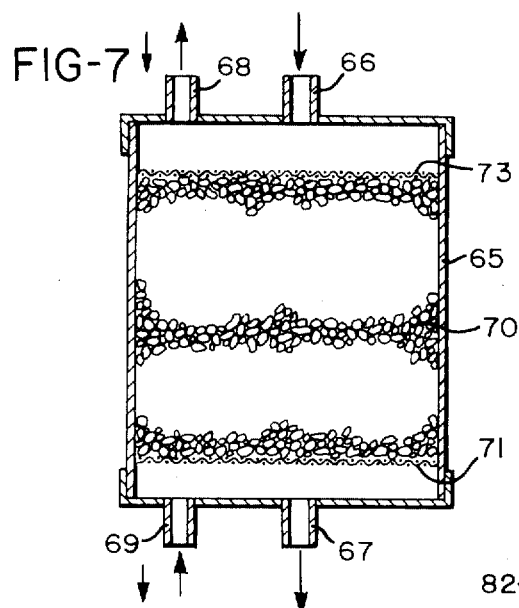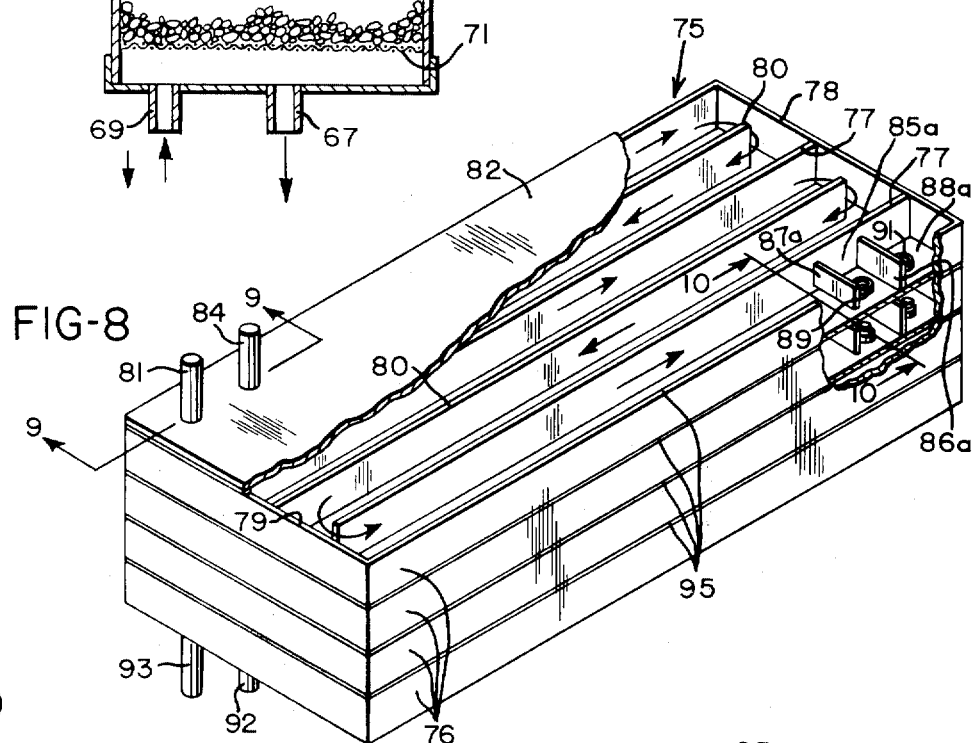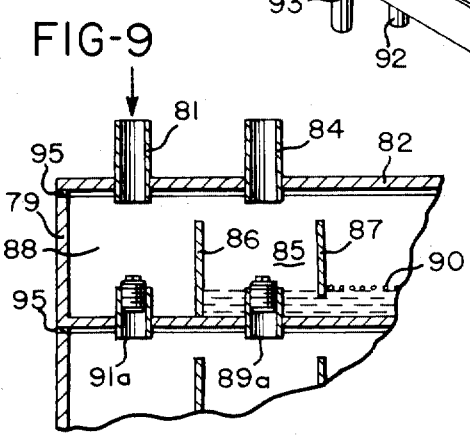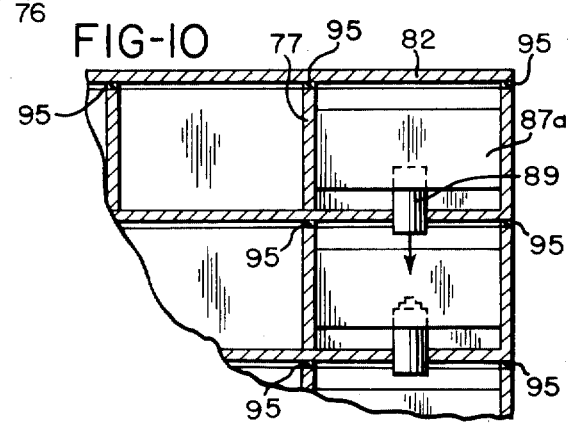

APPARATUS FOR CONDUCTING CHEMICAL REACTIONS IN THE PRESENCE OF TWO OR MORE FLUID PHASES

CROSS-REFERENCE TO RELATED APPLICATIONS

This is continuation of U.S. application Ser. No. 356,469, filed May 2, 1973, which in turn is a continuation-in-part of application Ser. No. 87,503, filed Nov. 6, 1970, and now abandoned.

BACKGROUND OF THE INVENTION

This invention relates to apparatus and systems for increasing the rate or product formation in spontaneous reduction-oxidation reactions, or for producing preferentially one particular product where alternate products are possible, in which the reactants are present in the form of two unmixed fluid phases in contact. Specifically, the invention relates directly to the art of catalysis and electrocatalysis in which a solid catalyst surface is provided at the interface between the reactants, which surface establishes the locus of the chemical reaction, the solid surface, at the interface between reactants being electronically conductive for optimum performance.

DESCRIPTION OF THE PRIOR ART

In the field of catalysis, it is known that certain finely divided materials increase the rate of reaction. For example, finely divided nickel and cobalt have been used as catalysts in the hydrogenation of vegetable oils. For example, U.S. Pat. No. 1,083,930 teaches that improved results are obtained by the use of thin foils or flakes which remain more easily dispersed than do fine powders. In this and other examples, hydrogen gas is bubbled through the vegetable oil, so that both catalyst particles or flakes and undissolved hydrogen bubbles are usually contacted on all of their surfaces by the oil. Apparently the principal reaction occurs between hydrogen gas dissolved in the oil which contacts the catalyst, the latter completely wetted by oil.

U.S. Pat. No. 2,365,729 describes the oxidation of an aqueous acid solution of ferrous sulfate to ferric sulfate in which granular activated carbon, presumably containing absorbed oxygen or air is used as the catalyst. The carbon is suspended in the liquid while the oxidant is bubbled therethrough, or an activated carbon diffuser is used to form oxidant bubbles which flow through the liquid, or the liquid and oxidant are concurrently passed through a tower or column packed with the activated carbon. The carbon is in these cases wetted on substantially all of its surface by the aqueous solution and is substantially completely surrounded by the bulk of the reductant liquid.

U.S. Pat. No. 1,146,363 describes the use of carbon in granular form as a catalytic or purifying agent, the carbon being in a column or percolator in which liquid is flowed through a bed of granular carbon. The carbon will be immersed in or flooded by the liquid, because of the absence of any provision of means for preventing such immersion or flooding.

Canadian Pat. No. 814,882, and the reference material cited therein, describes an adsorption process for the preparation of polysulfide pulping liquor in which hydrogen sulfide gas is adsorbed on activated carbon in the presence of air or oxygen, the hydrogen sulfide being oxidized to elemental sulfur which is deposited on the carbon. Once the carbon is saturated with sulfur, the sulfur is leached out by an alkaline solution. Best results are said to be obtained by saturating the hydrogen sulfide with water vapor prior to contact with the carbon and by removal of the formed sulfur by alkaline leaching in order to leave some alkaline residue for neutralization of the sulfuric acid formed during the reaction. The reactants for the oxidation step of this process are both gases, the reaction being said to proceed by a well-known sequence of first adsorption then oxidation, producing solid sulfur which progressively blocks the adsorptive carbon surface.

U.S. Pat. No. 3,249,522 discloses the use of hydrogen sulfide gas as the fuel in an electrochemical fuel cell, the products being sulfur, sulfides, polysulfides, and the generated electrical current. The fuel cell itself includes an anode and a cathode separated by an ion exchange membrane, the anode being carbon catalyzed with platinum and the cathode being carbon catalyzed with nickel. Hydrogen sulfide is fed into the anode compartment and oxygen is introduced into the cathode compartment, the electrolyte being alkaline. the process involves oxidation of the hydrogen sulfide at the anode and the reduction of oxygen at the cathode. As with electrochemical processes in general, the cell is characterized by having electrodes and electrical leads for the purpose of conducting electrical current outside of the cell. The oxidative reactions occur at one electrode, the reductive reactions occur at the other electrode, and the chemical oxidants and reductants are prevented from meeting within the cell by the central membrane. The reaction occurring at each electrode involves one chemical species and electrons, and is catalytically accelerated by the composition of the respective electrode, thus increasing the electrical current produced.

U.S. Pat. No. 3,409,520 describes an electrochemical system for removal of hydrogen sulfide gas from a natural gas mixture, the system being electrolytic in nature. The electrolysis cell includes an anode spaced and separated from the cathode by a diffusion barrier. With an acid electrolyte, the anodic oxidation product is sulfur while hydrogen gas is formed at the cathode. When the electrolyte is basic, the anodic oxidation product is polysulfide with hydrogen gas formed at the cathode. This system requires the application of current from an external source.

The catalytic oxidation of hydrogen sulfide in an alkaline solution to produce sulfur is described in U.S. Pat. No. 3,471,254. The catalyst is a phthalocyanine complex which is soluble in aqueous sulfide and insoluble in sulfide-free aqueous solutions, the catalyst being recovered as a curd and recycled.

U.S. Pat. No. 2,135,879 describes the air oxidation of calcium hydrosulfide, i.e., the reaction product of lime or calcium hydroxide and hydrogen sulfide, using a nickel sulfide catalyst which produces polysulfide, thiosulfate and sulfate in the ratio of 74:73:17. To increase the amount of polysulfide, 0.1% to 1.0% of hydrogen sulfide gas is admixed with the air oxidant to provide an excess of hydrogen sulfide in the oxidation stage.

U.S. Pat. No. 3,655,547 of Apr. 11, 1972, describes a bipolar electrode cell system in which the anode and cathode are in contact with a porous graphitic carbon member which is filled with electrolyte. Anodic products are formed at the anode and cathodic products are formed at the cathode, the face of the carbon member facing each electrode has surface portions coated with a mixture of charcoal and polytetrafluoroethylene, while other surface portions are uncoated. This unit is used to produce sulfuric acid from SO$_2$ stripped from flue gas.

U.S. Pat. No. 2,459,907 of Jan. 25, 1949, relates to a method of conducting chemical reactions by passing the reactants through a porous carbon column made by mixing carbon particles and pitch binder together, forming by heat and pressure, and baking to graphitize the carbon. The carbon column may contain catalytic inclusions. The purpose of the column is to reduce the thickness of the liquid reactant at the catalytic surface.

U.S. Pat. No. 1,284,488 of Nov. 12, 1918, also discloses a method of reducing the thickness of a liquid reactant on a catalytic surface. This is done by centrifugal force, which thins the liquid film and shortens the diffusion time necessary for the gaseous reactant to reach the surface of the catalyst.

Reference is also made to U.S. Pat. No. 3,666,405, of May 30, 1972, relating to reaction between two phases, one of which has a higher wettability with respect to a porous body. Preferably, the porous body has both large and small pores so that when the fluid phase with the lower wettability is introduced under a higher hydrostatic pressure than the fluid phase having the higher wettability, the smaller pores will be filled with the higher wettability fluid and the larger pores with the lower wettability fluid, thus forming a large interface between the two fluid phases. Alternatively, it is disclosed that the porous body may have a multiplicity of uniformly sized pores of two different wetting properties. It is stated that this may be achieved by constructing the porous body of a mixture of metal and resinous material or making the porous body of or coating the interior of the pores with various hydrophobic resinous material.

Canadian Pat. No. 700,933 of Dec. 29, 1974, describes a system for the electrolysis of sodium chloride brine in which the cathode is porous and supplied with oxygen gas to prevent formation or evolution of hydrogen. In one form, the cathode compartment contains a slurry of particulate solids which is agitated by the air stream or by mechanical agitation. The particulate material may be graphite and coated with a hydrophobic material such as tetrafluoroethylene.

Finally, reference is made to U.S. Pat. No. 2,722,504 to Fleck. The Fleck patent relates to conducting petrochemical reactions with a solid catalyst material that has a minor amount of silicone resin on its surface. The vapor phase reactions discloses a Fleck are isomerization, desulfurization, hydrogenation, hydroforming, reforming hydrocracking, destructive hydrogenation and the like. There is no suggestion in Fleck that the catalyst materials could be used for catalyzing reactions in the presence of an aqueous liquid phase or that the treated catalyst materials lead to any improvement in reaction rates in such a system.

SUMMARY OF THE INVENTION

In accordance with the present invention various oxidation and reduction products are prepared by a reduction-oxidation process conducted in the presence of a solid catalyst material. The oxidant is a fluid such as oxygen, air or a mixture of oxygen with other gases, an aqueous solution of an oxidizing agent such as a permanganate, or organic material such as nitrobenzene, while the reductant is a second fluid, non-miscible with the oxidant, and which forms an interface with the oxidant, e.g., aqueous solution, an organic liquid, or gas such as hydrogen gas. The electronically conductive catalyst material, which is relatively inert chemically with respect both to the oxidant and the reductant, is believed to function by conducting electrons from contacting reductant molecules or ions to contacting oxidant molecules or ions, thus expediting the transfer of electrons involved in the reaction. Unlike known electrochemical systems, e.g., electrolysis or fuel cells in which the anode and cathode are separated by barriers or membranes and wherein oxidation takes place on one electrode and reduction on the other, the system of the present invention involves contiguous reactions of oxidation and reduction at the catalyst material and does not require the use of membranes or barriers.

The new redox system of this invention operates to increase the rate of product formation and affects the relative rate of product formation where multiple products are formed by oxidation or reduction. A typical example of the latter system is the oxidation of aqueous sulfide solution with the formation of either sulfur or thiosulfate products.

Thus, in accordance with this invention the oxidant and the reductant are simultaneously brought into contact with the solid catalyst material and into contact with each other, but minimizing the contact of the oxidant with the reductant except at the locus where both are in contact with the catalyst material. In such systems according to the invention, the oxidant and reductant form an interface, the catalyst material being positioned at the interface and maintained simultaneously in contact with both the reductant and oxidant.

An important aspect of the present invention is preventing the solid catalyst material from being in exclusive contact with only one of the reactants, that is, either the reductant or the oxidant. When used in describing this invention, the term "flooded" means that the catalyst material is in exclusive contact with either oxidant or reductant. If the catalyst material of the present invention is flooded, the increase in rate of production formation is not achieved.

Considerations in catalysis and electrochemistry may be applicable in some degree to the new discoveries of this invention. For example, if the catalyst material of the present invention is considered an electrode, even though no lead wires are attached for supplying or removing electrical current, both oxidation and reduction take place at the same "electrode", i.e., one member acts as both an anode and a cathode and both the oxidation and the reduction product are generated at the same "electrode" member. While such a member could be characterized as a "mixer potential electrode", the kinetics of the system of the present invention are not sufficiently defined or understood as to provide a complete explanation of the reaction mechanism. Similarly, in view of the solid nature of the conductive material, elements of heterogeneous catalysis would seem to be present since the effect of the present system is to increase the rates of product formation substantially above those possible in the absence of the solid catalyst material. Characterization by a term such as heterogeneous catalysis, likewise, does not provide a complete explanation or understanding of the reaction mechansim.

Regardless of whether the explanation of the reaction mechanism is based on catalysis, electrochemistry or some combination of disciplines, data obtained provide the following general rules applicable to the present invention:

a. The reduction-oxidation reaction must be thermodynamically spontaneous in the sense that the change in free energy is negative;

b. The oxidant and the reductant should be capable of forming an interface or boundary;

c. Flooding of the catalyst material should be avoided; and d. Both oxidant and reductant should be in contact with each other and the catalyst material.

In those cases where certain of alternate possible products are to be preferentially formed, the following additional rules are applicable;

e. Intermixing of the oxidant and reductant outside the locus or region of catalyst material should be avoided; and f. Reaction between the reductant and oxidant other than at the "reduction-oxidation reaction zone", as hereinafter defined, should be minimized and preferably eliminated.

The procedures and system of the present invention involve a basically new concept and mode of operation in preparation of chemical materials by a reduction-oxidation reaction. This new operation involves the controlled contact of a fluid oxidant and a fluid reductant in which the contact is primarily at an interface in the locus of a solid catalyst material, the latter restricted contact being an essential element of the system. This controlled contact is in contradistinction to intermixing of the reactants as bubbles of gas in a liquid, as by a diffuser, and the reaction is carried out at the locus of contact between the oxidant, reductant and electronically conductive solid material. For the purpose of simplification, the following terms have been developed to indentify the process and the essential elements thereof:

"Contacogen" (trademark of The Mead Corporation, assignee of the present invention) means the electronically conductive solid material which forms the locus of the interfacial contact for the reductant and oxidant and which should be simultaneously contacted by them to produce the desired reaction, i.e., a catalyst.

"Reduction" is the net change undergone by a chemical species (the oxidant) acting as an electron acceptor.

"Oxidation" is the net change undergone by a chemical species (the reductant) acting as an electron donor.

"Reduction-oxidation reaction zone" is that locus of simultaneous contact between the oxidant, reductant and catalyst in which the major part of the reaction products are formed.

Since the reaction zone involves a gas, a liquid and the catalyst, or two liquids and the catalyst, the catalyst must be in contact with the gas and wetted by the liquid but not flooded by either, or in contact with both liquids and not flooded by either. Wetted, as used here, means that the contact angle between the catalyst and the one liquid is low, e.g., less than about 90° and approaching zero. If the contact angle is high, e.g., greater than about 90° and approaching 180°, then the one liquid will tend to draw away from the surface of the catalyst, and the surface of the catalyst is in effect in substantial contact only with the gas, or other liquid, that is, flooded by the gas, or other liquid. On the other hand, with the surface of the catalyst readily wetted by the one liquid, that is, with a contact angle approaching zero between the catalyst surface and the one liquid, the one liquid will tend to cover the surface of the catalyst, and the surface of the catalyst is in effect in substantial contact only with the one liquid, that is, "flooded" by the one liquid. One method of preventing flooding by one or the other of the liquids is by treatment of the catalyst which is designated as "wetproofing". This adds to the catalyst a minor proportion of an inert substance not wetted by one or the other of the liquid reactants, that is, the contact angle between this inert additive and one or the other liquids is greater than about 90°.

Accordingly, a primary object of the present invention is the provision of an improved system for carrying out reduction-oxidation reactions of the type described in which the rate of product formation is increased by the use of a wetproofed catalyst.

Another object is the provision of an improved process for conducting redox reactions on a batch basis or continuous basis in which the oxidant and the reductant are non-miscible fluids, and wherein both the oxidant and reductant are brought into interfacial contact with each other and simultaneously into contact with an electronically conductive solid catalyst material.

Another object of the present invention is the provision of a relatively simple apparatus for carrying out a redox reaction in which a catalyst is maintained in a nonflooded condition but in contact with both the oxidant and reductant, the latter being in contact with each other substantially only in the region or locus of their contact with the catalyst.

Another object of the present invention is the provision of an improved system for carrying out reduction-oxidation reactions in which one of the reactants is a gas and the other a liquid and in which reaction between the reactants other than in the reductant-oxidation zone is minimized.

Another object of the present invention is the provision of a system and apparatus for carrying out reduction-oxidation reactions which are thermodynamically spontaneous in the sense that the change in free energy is negative and wherein a catalyst is used in the form of particulate wetproofed electronically conductive solid catalyst material.

The physical embodiment of the system of the present invention may take any one of several different forms. For example, flooding of the catalyst may be prevented by wetproofing the catalyst material in which event various configurations may be employed, e.g., "floating bed", vertical arrangements, column or tower.

BRIEF DESCRIPTION OF THE DRAWINGS

FIG. 1 is a schematic illustration of a reactor in accordance with the present invention;

FIG. 2 is a schematic illustration of a reactor in accordance with the present invention in which there are two product-producing zones;

FIG. 3 is a simplified illustration of a reactor in accordance with the present invention in which wetproofed solid particulate cataylst material is floated on the surface of the reductant;

FIG. 4 is a schematic illustration of a continuous reactor in accordance with the present invention in which the catalyst is maintained at the interface between the oxidant and reductant;

FIG. 5 is a diagrammatic illustration of another form of continuous reactor in accordance with the present invention in which a plurality of trays are used, and wherein the catalyst is floated on the surface of the reductant;

FIG. 6 is a sectional view taken along the lines 6—6 of FIG. 5;

FIG. 7 is a sectional view of a column tower in accordance with this invention;

FIG. 8 is a diagrammatic illustration of a closed tower reactor in accordance with the present invention, with portions broken away to expose the interior components thereof;

FIG. 9 is an enlarged fragmentary section taken along the line 9—9 of FIG. 8; and FIG. 10 is an enlarged fragmentary section taken along the lines 10—10 of FIG. 8.

DETAILED DESCRIPTION OF THE INVENTION

The rate-increasing capability achieved by the present invention has been demonstrated by the following representative illustrations of reduction-oxidation reactions which have been conducted following the principles of this invention:

a. Oxidation of ammonium, potassium, sodium and strontium sulfides, respectively, by air, to the corresponding polysulfides or thiosulfates;

b. Oxidation of sodium thiosulfate by air to sodium sulfate;

c. Oxidation of ferrous sulfate or ferrous amonium sulfate by air to ferric sulfate;

d. Oxidation by air of hydrogen sulfide dissolved in alkaline salts;

e. Oxidation by air of sodium or potassium iodide to iodine;

f. Oxidation of hydroquinone to quinhydrone by air;

g. Oxidation of phenols by air;

h. Oxidation of sodium stannite to sodium stannate by air;

i. Oxidation of benzidine by air to benzidine blue;

j. Oxidation of leuco indigo to indigo blue by air;

k. Oxidation of succinic aldehyde by air;

l. Reduction of silver nitrate by hydrogen gas to silver;

m. Reduction of ceric sulfate to cerous sulfate by hydrogen gas;

n. Oxidation by air of benzaldehyde to benzoic acid;

o. Oxidation by air of aniline;

p. Reduction by hydrogen of potassium permanganate;

q. Reduction of chlorine by water; and r. Reduction of nitrobenzene by aqueous sodium sulfide.

The oxidant and reductant may be organic or inorganic materials in the form of gases, liquids or liquid solutions. The oxidant and reductant are also characterized by the formation of an interface or boundary when the two are brought into contact with each other, for example gas-liquid liquid-gas; and liquid-liquid systems.

The catalyst material is a solid which is essentially inert with respect to the oxidant, the reductant, and the products in the sense that it is not chemically attacked of reactive therewith. A material having a high surface-area-to-weight ratio is preferred because it furnishes greater interfacial contact. The resistivity of the material should be such that it will permit transference of the electrons involved in the reaction. Materials having a resistivity of less than about $10^5$ ohms-centimeters may be used although the preferred materials have a resistivity of $10^3$ ohms-centimeters or less.

In addition, the catalyst is structured to promote simultaneous contact with both the oxidant and reductant and may be in various physical forms to accomplish this purpose. In the case of a catalyst in particulate form, the particles are structured to provide a large surface area, for example, the particles are individually non-porous solids of large surface area, or they may be structured to form larger particles which are porous. When the catalyst is a plate or solid unitary member, as for example made by bonding particles together, the member is structured by maintaining porosity and large surface area. It will be apparent, accordingly, that various forms of catalyst may be used, and various configurations may be employed. The catalyst may be supported on a plate, or formed into a tube or plate. The catalyst may be stationary or movable, e.g., a rotating tube. Whatever the form, the catalyst should be, in addition to the qualities already discussed, structured to achieve a relatively high surface area and to promote simultaneous contact with the reactants.

To initiate and to control the reaction in accordance with the present invention, the reductant and the oxidant are brought into contact with each other and with the catalyst and maintained in the relation that the oxidant and reductant are in contact with each other substantially only in the same region where they are simultaneously in contact with the catalyst. An important aspect of the present invention is preventing the catalyst from being flooded by either the reductant or oxidant. If the catalyst is flooded by liquid reactants, the liquid film slows considerably the rate of diffusion of the other reactant to the surface of the catalyst. If the catalyst is flooded by a gaseous reactant, the liquid reactant is prevented from reaching the surface of the catalyst in the manner contemplated by the present invention. When operated in a non-flooded condition, as described above, the rate of product formation is increased, and where there are multiple alternative oxidation or reduction products, the relative rates of product formation may be altered.

An important aspect of the present invention is assuring that the oxidant and reductant contact each other primarily at the locus of the catalyst.

In the case of porous materials used as a catalyst, it will be understood that neither the oxidant nor the reductant should be forced through the pores of the catalyst in the sense that a porous member is used as a diffuser to form small bubbles of one reactant which are in intermixing contact with the other reactant.

Typical of the catalyst materials which may be used are carbon, activated carbon, platinized asbestos, nickel, or carbon or activated carbon containing inclusions such as nickel, iron cobalt, silver, platinum palladium manganese oxides (e.g., manganese dioxide), manganese sulfides, iron oxides or hydrated oxides, nickel oxide, nickel sulfide and cobalt sulfate or mixtures thereof. Of the above materials, carbon and activated carbon appear to provide optimum performance because of the relatively large surface-area-to-weight ratio obtainable and the simplicity with which inclusions of metals and compounds of metals may be introduced into the material, as well as the degree to which carbon may be finely divided. Moreover, this is a readily available material which may be obtained in a wide variety of particle sizes and surface areas. Carbons from different sources often result in different reaction rates. These variations are easily determined by simple procedures. Typical of the carbons useable in accordance with the present invention are carbon black, furnace black, channel black or carbons prepared by known procedures from various sources, for example, wood, corn cobs, beans, nut shells, bagasse, lignin, coals, tars, petroleum residues, bones, peat and other carbonaceous material.

The particle size may vary from 9 millimicrons to relatively large size, e.g., 1 inch or more, and usually the carbon is supplied as a mixture of various particle sizes. The surface area of the carbonaceous material may vary from 3 square meters per gram to in excess of 950 square meters per gram, as characterized by gaseous absorption using the BET method.

The carbon may be arranged in various physical arrangements, e.g., a porous nickel substrate with powdered platinum covered by powdered carbon and wetproofing agent, all disposed on one side of the nickel substrate as described in "Fuel Cells", Prentice Hall, 1969, pp. 402–403; a porous carbon plate or tube wetproofed to prevent flooding, or a mass of wetproofed carbon granules or powder which float on the surface of the reductant; or a bed of catalyst particles of depth greater than the capillary rise of the liquid reactant and supported so as to be in contact with the surface of the liquid reactant.

Carbon may be wetproofed as follows:

Polytetrafluoroethylene (PTFE) in emulsion form is intermixed with particulate carbon in an amount of between 0.1% to 100% based on carbon solids. The mixture is heated to remove the vehicle and dispersing agent for the PTFE. Another wetproofing method involves treating particulate carbon in the ratio of 1 gram of linear polyethylene per 10 grams of carbon. The polyethylene is dissolved in the ratio of 1 gram of polyethylene per 100 grams of hot toluene and poured over the carbon. After treatment, the carbon is heated at approximately 105° C to evaporate the toluene. The particles are not uniformly repellent but most of them are sufficiently repellent to float from several hours to several days.

Using the procedure described above, particulate carbon may also be wetproofed against aqueous reactants with polystyrene, fluorocarbon resins, polyethylene emulsions, silicones, or other hydrophobic materials, by any suitable procedure that avoids complete encapsulation by hydrophobic materials impermeable to the reactants or products formed. Other materials which may be used are polychlorotrifluoroethylene, prepolymerized silicone oils, and high vacuum silicone grease, for example.

Also using the procedure described above, any of the heretofore mentioned catalysts, particulate carbon being only an example, may be wetproofed with polystyrene, polytetrafluoroethylene, polyethylene, silicones, polychlorotrifluoroethylene, prepolymerized silicone oils, high vacuum silicone greases, (poly (chloro-p-xylylene), paraffin wax, paratoluene, sulfonamide, polydichlorodifluoroethylene, and octadecyl amine.

Another procedure includes subliming a chlorinated paraxylylene dimer in a vacuum chamber, and depositing the vapor on materials such as particulate carbon and porous sintered nickel, thereby forming a poly (chloro-p-xylylene), kown as "paraylene C".

In the case of materials such as finely divided platinum in an asbestos matrix, wetproofing is accomplished by using a 1% solution of polyethylene in toluene, wetting the asbestos matrix with the solution, draining off excess liquid then drying in an oven to evaporate the toluene.

In another example, paraffin wax is used in an amount varying from ½ to 2 grams per 10 grams of particulate carbon. The paraffin is dissolved in a solvent such as hexane or toluene, the carbon introduced into the mixture, heated and the solvent thereafter evaporated. Cetyl alcohol may also be used and applied in the same way. Any one of paratoluene sulfonamide, polydichlorodifluoroethylene and octadecyl amine may also be used and applied by intermixing with the carbon, and heating the mixture to cause the treating materials to adhere to the carbon.

The particulate carbon may be bonded by a carboxylated styrene-butadiene latex used in an amount of 5 grams of 25% solids dispersion per 10 grams of carbon. The resulting material is a sheet which may be supported at the interface of an oxidant and reductant. In another example, polyethylene was dissolved in toluene, the polyethylene being used in the ratio of 5 grams per 10 grams of granular carbon and the toluene removed by floating the mixture on boiling water. The result was a bonded product which was sufficiently porous to permit passage of the oxidant and sufficiently wetproofed to float.

Referring to FIG. 1, which illustrates one form of reactor of the present invention, a container 10 of polypropylene, stainless steel or the like is equipped with flow means 12 and 14 for introduction of a first fluid reactant and for removal of the reactant and reaction products. Positioned within the container and forming one wall thereof is a catalyst 15 in the form of a porous member. The container 10 is also provided with second flow means 16 and 17 for introduction of a second fluid reactant and for removal of unused reactant.

In operation, reactants are introduced through inlets 12 and 15 and establish an interface within the pores f the catalyst 15 thus forming the reduction-oxidation reaction zone. The one reactant introduced through inlet 12 may be liquid reductant which is passed from a reservoir (not shown) through the space 19 by means of a pump (not shown) and thence back to the same or another reservoir. The oxidant may be a liquid or a gas admitted into space 20, and in the case of gas is under slight pressure. The catalyst may be in the form of a porous plate, wetproofed to prevent flooding.

EXAMPLE 1

A small unit was constructed according to FIG. 1 and the description above, in which the catalyst was a porous nickel substrate with platinum black, porous powdered carbon and wetproofing agent deposited thereon, the whole forming a porous plate with an area of 7.5 square inches in contact with the reductant liquid. The reductant liquid circulated through the space 19 was a two molar solution of sodium sulfide, and the oxidant was gaseous oxygen admitted to space 20 from a pressure cylinder, a water column being used to maintain a pressure of 16 inches of water on the oxygen in space 20. The sodium sulfide solution was circulated from a small reservoir, through space 19, and back to the same reservoir. After 65 hours of operation, analysis of the circulating solution showed that oxidation had occurred to produce 72.7 grams of sulfur, but no thiosulfate, according to the equation $Na_2S + \frac{1}{2}O_2 + H_2O \rightarrow S + 2NaOH$. This sulfur production corresponds to a consumption of oxygen at the rate of 10.7 grams of oxygen per hour per square foot of catalyst surface.

EXAMPLE 2

Example 1 was repeated, with the difference that the catalyst was a porous, wetproofed carbon plate, about one-fourth inch thick. In this latter instance, after 23 hours of operation, analysis of the circulating solution showed that oxidation had occurred to produce 26.6 grams of sulfur, according to the equation $Na_2S + \frac{1}{2}O_2 + H_2O \rightarrow S + 2NaOH$, and also 28.2 grams of sodium thiosulfate according to the equation $2Na_2S + 2O_2 + H_2O \rightarrow Na_2S_2O_3 + 2NaOH$. These products correspond to a consumption of oxygen at the rate of 18.1 grams of oxygen per hour per square foot of catalyst surface.

For comparison it should be noted that oxygen gas passing over the surface of a sodium sulfide solution, in the absence of the catalyst, reacts much less rapidly than in these two examples. Furthermore, such oxidation as occurs in this comparison case produces thiosulfate or even more highly oxidized products such as sulfite or sulfate. The apparatus in this example of FIG. 1 has accomplished the result of increasing the rate of oxidation while preferentially forming the less highly oxidized product, namely, sulfur. Also the catalyst of Example 2 caused an oxidation rate 1.7 times that of the catalyst of Example 1, for reasons unknown, but presumed to be related either to the permeability to oxygen or to the diffusivity to the solution, or both.

As is apparent, the apparatus shown in FIG. 1 may be oriented with the catalyst 15 disposed horizontally above the space 19 by turning the entire apparatus 90°. In this form, the space is preferably used as a liquid space, the levels of the liquid being so maintained that the liquid contacts the catalyst but does not completely surround the entire member 15. The other fluid is also in contact with catalyst 15 and contacts the liquid in space 19 to form the interface within the pores of the catalyst to establish the reaction zone. In either orientation, little, if any, fluid passes completely through the catalyst to form bubbles in the liquid reactant, thereby assuring that the redox reaction is carried out primarily at the locus of the catalyst. When so oriented, it may not be necessary to use a pressure system for the fluid which is in space 20.

In the form shown in FIG. 2, wherein the same reference numerals have been used were applicable, a variant is illustrated in which two separate catalyst members 15 and 15a are used to form facing walls of the container 10. The space 19 receives one of the fluid reactants which is introduced through inlet 12, the reaction product being removed through discharge 14. The second fluid reactant is introduced through inlets 16, 16a and unreacted material and product may be withdrawn through discharges 17, 17a.

EXAMPLE 3

A small unit was constructed according to FIG. 2, in which there were two facing catalyst members, each of 7.5 square inches area, and both being porous plates made of porous nickel substrate with platinum black, porous powdered carbon and wetproofing agent deposited thereon. The reductant liquid circulated through the space 19 was a two molar solution of sodium sulfide, and the oxidant was gaseous oxygen admitted to spaces 20 and 20a from a pressure cylinder, a 16-inch water column being used to maintain pressure on the oxygen in the spaces. The sodium sulfide solution was circulated from a small reservoir through space 19, and back to the same reservoir. After four hours of operation, analysis of the circulating solution showed that oxidation had occurred to produce 26.6 grams of sulfur, but no thiosulfate. This production of sulfur corresponds to a consumption of oxygen at the rate of 32.0 grams of oxygen per hour per square foot of catalyst surface.

A simple arrangement for practicing the present invention on a batch basis, and for evaluating catalysts is illustrated in FIG. 3 in which a container 25 includes liquid reactant 26. The catalyst 29 is in the form of particles which float on the surface of and are supported by the liquid reactant and which are simultaneously on contact with the other reactant which may be a liquid or a gas.

The relatively simple arrangement illustrated in FIG. 3 may be used for determining the effectiveness of various catalyst systems, undertaking preliminary feasibility determination and for use in liquid-liquid or gas-liquid systems. The particular arrangement of FIG. 3 may be used with a catalyst which is supported at the interface, and a convenient effective means to accomplish this is to wetproof the catalyst, for example, wetproofed particulate carbon. In this way, a floating bed configuration is achieved in which the catalyst is maintained at the interface formed between the two reactants.

EXAMPLE 4

Oxidation by Air of Sodium Sulfide

A 250 ml. glass beaker 2.5 inches in diameter, was used as the container for a batch reaction. In it was placed 175 ml. of two molar sodium sulfide solution, and on the surface of the solution was sprinkled carbon particles removed from the face of a fuel cell electrode. Activity was apparent by the formation of a layer of yellow color spreading through all of the solution and heat generated at the surface. The sodium sulfide solution is the reductant in this case, and oxygen in the air the oxidant. After 1.25 hours, the solution was analyzed. The experiment was twice repeated, with analyses after four hours, and after 72 hours, respectively. The same experiments were repeated yet again, but with the difference that the floating carbon was an activated carbon rendered wetproof by treatment with polyethylene in a manner described hereinbefore. In contrast with the brilliantly colored solutions under the floating carbon, sodium sulfide solutions exposed to air under identical conditions without the floating carbon remained colorless to the eye, and with negligible amounts of oxidation products on analysis. All of the numerical results of these experiments are summarized in the following table:

| Time in Hours | Grams of Sulfur Formed | Grams of Sodium Thiosulfate Formed | Oxygen Consumption to Produce these Sulfur products grams/hour/square foot of exposed surface |
|---|---|---|---|
| Carbon from Fuel Cell Electrode | | | |
| 1¼ | 1.96 | None | 2.26 |
| 4 | 3.69 | None | 1.33 |
| 72 | 5.37 | 6.04 | 0.35 |
| Activated Carbon, Polyethylene Treated | | | |
| 5 | 0.98 | None | 0.28 |
| 24 | 3.88 | None | 0.23 |

EXAMPLE 5

Oxidation by Air of Hydrogen Sulfide Absorbed in Alkaline Salts

Hydrogen sulfide gas was bubbled through an aqueous solution containing 20% of tripotassium phosphate, $K_3PO_4$. The resulting solution was divided into portions of 90 grams each, placed in 250 ml. glass beakers each of approximately the same dimensions, hereinafter referred to as "matched". On one portion was floated 2 grams of activated carbon wetproofed with 2% PTFE (based on carbon weight), while another portion was left without carbon. The above procedure was repeated except that an aqueous solution containing 40% of tripotassium phosphate was substituted for the 20% solution. The beakers containing the portions of solution were exposed to the ambient atmosphere for measured times, after which aliquots were withdrawn and analyzed for sulfide sulfur and zero-valence sulfur, respectively, the latter apparently in solution as potassium polysulfide. The results are summarized in the following table, in which the analytical compositions found are expressed in grams per liter as sulfur:

One solution was made by dissolving ferrous ammonium sulfate, another by dissolving ferrous sulfate. Portions of 200 grams each of the ferrous ammonium sulfate solution, and portions of 150 grams each of the ferrous sulfate solution, were placed in matched 400 ml. glass beakers. On one portion of each species of solution was floated activated carbon, wetproofed with 1 % of polyethylene, in quantity just sufficient to cover the surface. On another portion of each species of solution was floated a similar quantity of carbon scraped from a fuel cell electrode. One portion of each species of solution was left as is, without carbon. The six beakers containing the portions were exposed to ambient air, and aliquot samples were taken from each after timed intervals. The samples were analyzed for ferrous iron by a standard procedure using potassium per-manganate titration. The results were summarized in the following

| Time of Exposure to Air - hours | 20% $K_3PO_4$ No Carbon | | Carbon with 2% P'ethylene | | Time of Exposure to Air - hours | 40% $K_3PO_4$ No Carbon | | Carbon with 2% Polyethylene | |
|---|---|---|---|---|---|---|---|---|---|
| | Sulfide | Sulfur | Sulfide | Sulfur | | Sulfide | Sulfur | Sulfide | Sulfur |
| 0 | 2.8 | none | 2.8 | none | 0 | 5.1 | none | 5.1 | none |
| 3.33 | 2.4 | none | 0.8 | 1.5 | 4.33 | 4.5 | none | 1.6 | 2.4 |
| 27 | 1.7 | none | 0.4 | 1.1 | 28 | 3.0 | none | 0.7 | 2.8 |

The presence of the floating carbon in the above experiments has clearly increased the rate of disappearance of sulfur in the form of sulfide and increased the rate of appearance of zero-valence sulfur, compared with the rates of oxidation found without the carbon, under otherwise identical conditions.

EXAMPLE 6

Oxidation by Air of Sodium Thiosulfate

Sodium thiosulfate, $Na_2S_2O_3.5H_2O$, in the amount of 100 grams was dissolved in water to make 1000 grams of solution, and 60 grams of sodium bicarbonate were added and dissolved, for an alkaline buffer to prevent precipitation of free sulfur. Portions of the solution of 200 ml. each, that is, 215 grams, were placed in matched 250 ml. glass beakers. On the surface of one portion was floated 2 grams of activated carbon wetproofed with 2% PTFE. Aliquot samples were withdrawn from each beaker after timed intervals, and analyzed by standard procedures for remaining thiosulfate and for sulfate. Compositions are expressed in grams per liter of the formula indicated. Results obtained are summarized in the following table:

| Time of Exposure to air - hours | No Carbon | | Activated Carbon with 2% Polyethylene | |
|---|---|---|---|---|
| | $Na_2S_2O_3$ | $SO_4^{--}$ | $Na_2S_2O_3$ | $SO_4^{--}$ |
| 0 | 68.3 | 0.7 | 68.3 | 0.7 |
| 48 | 67.0 | 0.6 | 63.4 | 1.8 |
| 120 | 64.5 | — | 52.5 | — |

The presence of floating wetproofed carbon has clearly increased the rate of disappearance of sodium thiosulfate. Only a portion of the oxidation product was sodium sulfate, because the sulfate found was less than equivalent to the thiosulfate lost. Sodium sulfite, believed to be one of the oxidation products, would not be found in the analysis for sulfate and no analysis was made for the sulfite.

EXAMPLE 7

Oxidation by Air of Ferrous Sulfate to Ferric Sulfate

Ferrous solutions were prepared having a concentration of about 3 grams per liter of ferrous iron to which was added 32 ml. of 10 5 aqueous sulfuric acid per liter.

table, in which the values are grams per liter of ferrous iron:

| Time of Exposure to Air - hours | Ferrous Ammonium Sulfate | | | Ferrous Sulfate | | |
|---|---|---|---|---|---|---|
| | No Carbon | Carbon with 2% PE | Fuel Cell Carbon | No Carbon | Carbon with 2% PE | Fuel Cell Carbon |
| 0.5 | 2.8 | 2.8 | 2.7 | 3.0 | 3.0 | 3.0 |
| 5 | 2.6 | 2.6 | 2.5 | 2.8 | 2.7 | 2.6 |
| 24 | 2.7 | 2.5 | 2.3 | 2.8 | 2.7 | 2.4 |
| 29 | 2.7 | 2.5 | 2.3 | 2.9 | 2.6 | 2.3 |
| 48 | 2.8 | 2.5 | 2.1 | 3.0 | 2.6 | 2.1 |
| 53 | 2.8 | 2.4 | 2.1 | 3.1 | 2.6 | 2.0 |
| 72 | 3.0 | 2.4 | 2.4 | 3.3 | 2.5 | 1.9 |
| 77 | 3.0 | 2.4 | 1.9 | 3.4 | 2.6 | 1.9 |
| 144 | 3.6 | 2.1 | 1.4 | 4.8 | 2.5 | 1.5 |

These results may be explained by noting that uncompensated evaporation of water was occurring from all of the portions of solution, tending to cause an increase in concentration, while oxidation tends to cause a decrease in the concentration of ferrous iron by forming ferric iron. In the case of the portions with no carbon, the net change was an increase in concentration because of very slow oxidation, and evaporation, while in the case of the portions with floating carbon, the net change was a decrease in concentration because of the more rapid oxidation of ferrous to ferric iron.

EXAMPLE 8

Oxidation by Air of Sodium Stannite to Sodium Stannate

A stock solution was prepared by dissolving approximately 0.075 gram formula weight of stannous chloride in two molar sodium hydroxide to make a liter of solution (about 9 grams of tin per liter). Portions of this solution of 50 grams each were placed in matched 150 ml. glass beakers. On the surface of one portion was floated 0.5 grams of activated carbon wetproofed with 2 % of polyethylene. On the surface of another portion was floated 0.2 grams of carbon scraped from the surface of a fuel cell electrode. The surface of a third portion was left unaltered, that is, without floating carbon. After 3.2 hours of standing exposed to the air, samples were withdrawn from each portion and analyzed for stannous tin by a standard procedure using potassium per-manganate titration. The concentrations of stannous tin found, in grams per liter, were as follows, to be compared with an initial value of 8.9 :

| No Carbon | Carbon with 2% Polyethylene | Carbon from Fuel Cell Electrode |
|---|---|---|
| 6.4 | 2.1 | 0.7 |

The above figures may also be compared with results, obtained from bubbling air at a rate of 600 cc. per minute through 60 ml. of a similar stock solution of sodium stannite contained in a vertical glass tube 2.5 cm. in diameter:

| Time in Hours: | 0 | 1 | 2.5 | 3.5 | 4.5 | 5.5 |
|---|---|---|---|---|---|---|
| Stannous tin, g/l: | 9.1 | 8.6 | 5.7 | 4.5 | 3.1 | 1.6 |

It will be seen that the disappearance of stannous tin occurred more rapidly in this sparging condition than under the carbon-free quiescent surface, but the quietly floating carbon catalysts cause the disappearance of stannous tin even more rapidly. The product of the reaction is believed to be stannic tin which under the alkaline conditions of this Example will be in the form of sodium stannate.

EXAMPLE 9

Oxidation by Air of Sodium Iodide to Iodine

A solution of two molar aqueous sodium iodide solution was prepared. Portions of this solution of 20 grams each were placed in matched 50 ml. glass beakers. On the surface of one portion was floated 1.5 grams of activated carbon wetproofed with 2 % of polyethylene. The surface of another portion was left as is, that is, without floating carbon. After a short time, the solution under the carbon was observed to have a deep brown color. A benzene extract of this solution was purple. A drop of the brown aqueous solution caused a blue spot on starch-iodide paper, and another drop in a solution of amylose also developed a blue color. The portion exposed equally but without the floating catalyst developed a light yellow color. These facts indicate that air oxidation to release iodine was occurring with both samples, but many-fold rapidly in the solution under the floating carbon.

EXAMPLE 10

Oxidation by Air of Hydroquinone

Aqueous phosphoric acid with a pH of 4.0 was used as the solvent to dissolve 50 grams of hydroquinone to make one liter of solution. Portions of this solution of 200 grams each were placed in two matched 250 ml. glass beakers and one 1000 ml. glass beaker. On the surface of one of the portions in a 250 ml. beaker was floated 2 grams of activated charcoal wetproofed with 2 % of PTFE. Aliquot samples were withdrawn from each portion after standing for 48 hours, and remaining hydroquinone was analyzed by a standard procedure of titration with potassium dichromate to a potentiometric endpoint. Of the initial 10 grams of hydroquinone in each breaker, the remainder was as follows:

|  | No Carbon | | Activated Carbon with 2% PTFE |
|---|---|---|---|
|  | 250 ml. Beaker | 1000 ml. Beaker | 250 ml. Beaker |
| Surface Area, sq. cm. | 32 | 81 | 32 |
| Hydroquinone, grams | 9.5 | 9.5 | 8.6 |

The greater area of exposed surface is evidently without appreciable effect, while the presence of the wetproofed floating carbon accelerates the oxidative elimination of hydroquinone.

The procedure above, was repeated except that, the solution contained 11.5 grams of hydroquinone and 1 gram of sodium sulfite dissolved in aqueous sodium hydroxide of pH 9.5, to make one liter of solution; the catalyst consisted of the same activated carbon but wetproofed with 20% PTFE; and aliquot samples were withdrawn after several timed intervals. Of the initial 2.3 grams of hydroquinone in each beaker, the remainder was as follows:

| Time of Exposure to Air - hours | No Carbon | | Activated Carbon with 20% PTFE |
|---|---|---|---|
|  | 250 ml. Beaker | 1000 ml. Beaker | 250 ml. Beaker |
| 20 | 2.0 | 2.1 | 1.9 |
| 44 | 2.0 | 1.8 | 1.7 |
| 68 | 1.8 | 1.7 | 1.5 |
| 92 | 1.7 | 1.6 | 1.4 |
| 116 | — | — | 1.1 |

The product of the oxidation was believed to be quinhydrone, which is green. When one of the oxidized solutions, above, was evaporated to dryness, green crystals were found in the residue of white crystals.

In the above example, the greater surface area exposed in the larger beaker appears to increase the rate of oxidation, but the presence of floating carbon on the solution in a smaller beaker has a greater effect than the increased area.

EXAMPLE 11

Oxidation by Air of Phenols

A solution was made by dissolving one gram of 2,6-dimethyl phenol in 20 ml. of one normal sodium hydroxide. Half of the resulting solution was placed in each of two matched 50 ml. glass beakers. On the surface of one portion was floated 0.5 grams of activated carbon wetproofed with 2% of PTFE. The solutions in the beakers stood, first for three hours at 85° C., then overnight at room temperature. The solution under the floating carbon showed first yellowing then brownish darkening in less than an hour, while the solution with no carbon remained yellowish for the entire test period. Both solutions, after standing as above, were neutralized with hydrochloric acid, extracted with ethyl ether, and the ether extracts evaporated in watch glasses at room temperature. The first residues were a yellow oil from the no-carbon portion, and a gummy brown paste from the floated-carbon portion. After an additional five days, the yellow oil had evaporated, leaving the barest trace of brown solid residue. The gummy brown paste became a clear, brittle, reddish-brown solid.

The above procedure was repeated, except that the starting material was 2,6-diisopropyl phenol. Evaporation of the ether extracts left a mass of yellow crystals from the no-carbon portion and a mass of reddish-brown crystals from the floated-carbon portion. After an additional period of several days in a warm place, the yellow crystals had sublimed, leaving a trace of brown, while the reddish-brown crystals remained.

The final brown residues would not develop color with crystal violet lactone, the latter a sensitive reagent for phenols. Evidently the floating carbon accelerated an oxidative polymerization involving the phenolic groups, possibly forming polyphenoxy ethers.

EXAMPLE 12

Oxidation by Air of Benzidine

Benzidine hydrochloride was dissolved in water to make a solution about 5% by weight in concentration. Portions of this solution of 20 grams each were placed in matched 50 ml. glass beakers. On the surface of one of the portions was floated activated carbon wetproofed with 2% of polyethylene. On the surface of another portion was floated activated carbon wetproofed with 2% of PTFE. On the surface of a third portion was floated about 0.2 grams of carbon scraped from the surface of a fuel cell electrode. Other portions were left as is, with no carbon. After one hour, blue color was discernible in the solution under the carbon scraped from the fuel cell electrode, but not in any of the other portions. After about two hours, blue color was easily discernible in all of the solutions under floating carbons, but still not in the portions without carbon on the surface. As time passed, the blue color in the solutions under the floating carbons intensified slightly, then faded out again as the blue product was itself oxidized. At no time was blue color discernible in the exposed solutions with no floating carbon.

The action of oxidants to produce a blue color with benzidine is well known in analytical chemistry, and the essential color-producing oxidation product is said to be p-quinoneimide, which combines with unchanged benzidine to produce the colored compound.

EXAMPLE 13

Oxidation by Air of Aniline

Aniline hydrochloride was dissolved in water to make a solution of about 3% by weight in concentration, as aniline. Portions of this solution of 10 grams each were placed in matched 50 ml. glass beakers. On the surface of one portion was floated activated carbon wetproofed with 2% of polyethylene. The surface of another portion was left as is, with no carbon. The portions were exposed to ambient air overnight, after which it was observed that both portions of solution had turned brown, while additionally in the bottom of the beaker containing the solution on which the carbon floated, green crystals had collected.

The oxidation of aniline to produce colored compounds is well known in dye chemistry, although the exact structures of the colored products may be conjectural. Among the colored compounds produced by oxidation of aniline are those green substances known as violet protoemeraldine and blue emeraldine.

These results are believed to be a positive indication of an accelerated oxidation of aniline caused by the presence of the wetproofed catalyst, in addition to the ordinary browning of aniline which occurs readily upon contact with air.

EXAMPLE 14

Oxidation by Air of Leuco Indigo to Indigo Blue

A solution prepared by dissolving 0.2 grams of indigo carmine (a sulfonated indigo, C.I. 1180) and one gram of sodium carbonate in 500 grams of water was titrated with sodium hydrosulfite ($Na_2S_2O_4$) to the disappearance of the blue color. Portions of this solution of 150 grams each were placed in matched 250 ml glass beakers. On one portion was floated 5 grams of polyethylene beads. On another portion was floated 5 grams of activated carbon wetproofed with 2% of PTFE. On a third portion was floated 5 grams of activated carbon wetproofed with 10% of PTFE. After a few minutes, the solution under the carbon wetproofed with 2PTFE showed streamers of blue color from the top extending nearly to the bottom of the beaker, while at the same time the solution under the carbon wetproofed with 10% PTFE showed fewer streamers of blue color from the top, not reaching to the bottom, and the solution under the polyethylene beads showed only a thin blue film at the interface. After about 30 minutes, both of the solutions under floating carbon were deep blue, while the solution under the polyethylene beads was not significantly bluer than earlier.

These results are believed to indicate that the wetproofed catalyst are functioning to accelerate the oxidation of the leuco base to an indigo blue.

EXAMPLE 15

Oxidation by Air of Sodium Hydrosulfite and Leuco Indigo

A solution was prepared by dissolving 0.2 grams of indigo carmine and one gram of sodium carbonate in 500 grams of water, and the blue solution was rendered yellow by additionally dissolving 0.3 grams of sodium hydrosulfite, the latter providing an excess of reducing agent. Portions of this solution of 150 grams each were placed in matched 250 ml. glass beakers. On one portion was floated 5 grams of activated carbon wetproofed with 2% of PTFE, and other portions were left as is, without floating catalyst. After about 15 minutes, streamers of blue color were visible in the solution under the floating carbon, extending towards the bottom, while the portions without catalyst showed only very shallow and discontinuous patches of blue. The oxidation progressed so that after about two hours the solution under the floating carbon was completely dark blue, while the solution without carbon was still yellow except for the shallow and discontinuous patches of blue noted earlier.

Evidently the wetproofed catalysts accelerated the oxidative reactions so that all of the sodium hydrosulfite reducing agent and at least part of the leuco indigo were oxidized, as shown by the blue color, while after the same lapse of time in the absence of catalyst sodium hydrosulfite was still present, this reducing agent preventing the formation of significant amounts of indigo blue. The oxidation product of sodium hydrosulfite is believed to be sodium sulfite.

EXAMPLE 16

Reduction of Silver Nitrate by Hydrogen

Portions of 100 ml. each of aqueous silver nitrate solutions were placed in six matched 250 ml. glass Erlenmeyer flasks, and were exposed to similar gaseous atmospheres by virtue of being connected in series. Each flask was closed with a rubber stopper, through holes in which were passed two bent glass tubes, one tube serving as the entrance for the stream of gas, the other tube serving as the exit. In four of the flasks, the entrance and exit tubes merely passed through the stoppers but did not extend to the contained solution, while in two of the flasks the entrance tubes were long enough to pass below the surface of the contained solution and terminated in fritted glass diffusers, that is, spargers. The exit tubes were the same as in the other flasks.

Two solutions of silver nitrate were prepared, both starting with a stock solution of silver nitrate in water at a concentration of 10 percent by weight. The first was prepared by adding to 800 of stock solution 40 ml. of concentrated ammonia, slowly and with stirring, forming a brown precipitate, and then additional ammonia drop by drop until the precipitate re-dissolved. The second solution consisted of the stock solution unchanged. The two solutions were designated "ammoniacal" and "aqueous" to distinguish them. Portions of the "ammoniacal" solution were placed in three of the flasks, and portions of the "aqueous" solution were placed in the other three flasks.

Each set of three flasks contained one in which 4 grams of polyethylene beads were floated on the surface; one in which 4 grams of activated carbon wetproofed with PTFE was floated on the surface; and the other of which was closed with one of the stoppers containing a sparger. The flasks were connected in series with plastic tubing, the exit tube of one to the entrance tube of the next, in the sequence indicated in the tabulation below. A tank of hydrogen gas was connnected to the entrance tube of the first flask. Hydrogen flow was started at a rate of 100 ml. per minute into the first flask, and continued for 7 hours, interrupted overnight for 16½ hours, then resumed and continued at the same flow rate the next day for an additional 7½ hours. The appearance of deposits and precipitates in the flask was noted. Analysis was made by filtering out all insoluble materials, igniting the filter paper and other combustibles, and weighing the remaining ash. The silver remaining in the filtrate as silver nitrate was determined by titration. The proportion, as silver, of that found as insoluble compounds, and of that found as silver nitrate in solution, is expressed as percentage of the total amount of silver found in the analysis.

| Flask Position | Solution | Hydrogen Distinguishing Factor | Insoluble Silver % | Soluble Silver % | pH |
|---|---|---|---|---|---|
| 1 | Aqueous | PE Beads | 2.5 | 97.5 | 6.3 |
| 2 | Aqueous | Wetproofed Catalyst | 22.3 | 77.7 | 3.6 |
| 3 | Ammoniacal | PE Beads | 1.5 | 98.5 | 11.5 |
| 4 | Ammoniacal | Wetproofed Catalyst | 24.8 | 75.2 | 10.0 |
| 5 | Aqueous | Sparger | 6.3 | 93.7 | 9.4 |
| 6 | Ammoniacal | Sparger | 2.4 | 97.6 | 10.6 |

It was observed that Flask No. 1, above, showed a slight lusterless precipitate, whereas Flask No. 2 showed large amounts of shiny precipitate at the bottom of the flask. Flask No. 3 showed slight brown-colored precipitate, whereas Flask No. 4 had quantities of silver deposited on the carbon. Both flasks with spargers showed black deposits on the walls of the flasks, and dark precipitates beneath clear supernatant solutions.

Consideration of these data and descriptions suggests that the floating carbon was accelerating the reduction of silver nitrate to metallic silver, even compared to the process of bubbling hydrogen through the solution from a sparger. Concomitant with the formation of silver, acid is formed, and the last column showing pH also indicates that the greatest lowering of pH, that is, the greatest formation of acid, is associated with the flasks containing catalyst. Apparently the rate of reaction was affected in only a minor way by the presence or absence of ammonia.

EXAMPLE 17

Reduction of Potassium Permanganate by Hydrogen

Portions of 100 ml. each of aqueous potassium permanganate solution were placed in four matched 250 ml. glass Erlenmeyer flasks, and were exposed to similar gaseous atmospheres by virtue of being connected in series. Each flask was closed with a rubber stopper, through holes in which were passed two bent glass tubes, one tube serving as the entrance for the stream of gas, the other tube serving as the exit. In three of the flasks, the entrance and exit tubes merely passed through the stoppers but did not extend to the contained solution, while in one of the flasks the entrance tube was long enough to pass below the surface of the contained solution and terminated in a fritted glass diffuser, that is, a sparger. The exit tube was the same as in the other flasks. The solution was prepared by dissolving one percent by weight of potassium permanganate in water, and 100 ml. portions were placed in each flask. On the surface of solution in one of the flasks was floated 4 grams of polyethylene beads. On the surface of solution in another flask was floated 4 grams of activated carbon wetproofed with PTFE. A third flask was closed with the stopper containing a sparger. The flasks were connected in series with plastic tubing, the exit tube of one to the entrance tube of the next, in the sequence indicated in the table below. A tank of hydrogen gas was connected to the entrance tube of the first flask. Hydrogen flow was started at the rate of 100 ml. per minute into the first flask, continued for 6 hours, interrupted overnight and resumed for an additional 7½ hours. The contents of the flasks were analyzed by first filtering then titrating the filtrate for residual permanganate. The results are summarized in the following table:

| Flask Position | Distinguishing Factor | Concentration of Residual $KMnO_4$ - normality | Percentage of Depletion of $KMnO_4$ |
|---|---|---|---|
| 1 | PE Beads | 0.282 | 5.7 |
| 2 | Plain | 0.256 | 14.1 |
| 3 | Wetproofed Catalyst | 0.000 | 100.0 |
| 4 | Sparger | 0.121 | 59.7 |

The initial normality of the potassium permanganate solution was found to be 0.299. Upon final inspection, all specimens showed a dark brown precipitate at the bottom of the flask, with Flasks 3 and 4 showing more than the others. The rate of reaction in the flask containing the wetproofed catalyst, even although quiescent, has substantially exceeded the rate of reaction in the flask with the bubbling sparger. The presumed reaction is the reduction of potassium permanganate to an insoluble brown oxide of manganese, possibly manganese dioxide. The equation representing such a reaction is $2KMnO_4 + 3H_2 \rightarrow 2MnO_2 + 2KOH + 2H_2O$.

EXAMPLE 18

Reduction of Chlorine by Water

One-liter portions of de-ionized water prepared by distillation and passage through an ion-exchange resin bed were placed in four matched 2-liter glass reagent bottles, and were exposed to chlorine gas from a common manifold. Each bottle was closed with a rubber stopper through which passed two bent glass tubes, one tube serving as the entrance for the stream of gas, the other tube serving as the exit. In two of the bottles, the entrance and exit tubes merely passed through the stoppers but did not extend to the contained water, while in the other two bottles the entrance tube was long enough to pass below the surface of the contained water and terminated in a fritted glass diffuser, that is, a sparger. The exit tubes were the same on all bottles, and were open to the atmosphere of a fume hood. On the surface of water in two of the bottles were floated 20 grams of activated carbon wetproofed with PTFE. One of the bottles containing the floating carbon was closed with one of the stoppers containing a sparger. The inlets of the four bottles, each equipped with a stopcock, were connected by plastic tubing to the chlorine gas manifold, and the flows of chlorine into the bottles were adjusted to be approximately equal, maintaining a slight positive pressure to displace and exclude air from the bottles. The portions of water were thus kept under chlorine for 22 hours, at room temperature. Samples of the water in each bottle were analyzed promptly for dissolved chlorine (1.) by titration with sodium thiosulfate, and the pH (2.) was measured.

For better comparison, the pH values are converted to apparent hydrogen ion concentration (3.). The results are summarized in the following table, in which all values except pH are expressed as concentrations in equivalents per liter:

| | Immediate Analyses | | |
|---|---|---|---|
| Distinguishing Factors | 1. $Cl_2$ | 2. pH | 3. $(H^{30})$ |
| Plain, Quiescent | .17 | 2.1 | .008 |
| Wetproofed Catalyst, Quiescent | .01 | 1.3 | .050 |
| Wetproofed Catalyst, Sparger | .10 | 1.2 | .063 |
| Plain, Sparger | .17 | 2.1 | .008 |

It is generally believed that chlorine in contact with water may dissolve, thereby imparting to the solution a green tint, or may react with the water to form hydrochloric acid and hypochlorous acid, the latter characterized by a distinctive odor. The hypochlorous acid may decompose to form hydrochloric acid and oxygen. Hydrochloric acid is the source of hydrogen ion, which is measured by pH, while hypochlorous acid is relatively much less ionized. The sequence of reactions may be represented by the following chemical equations:

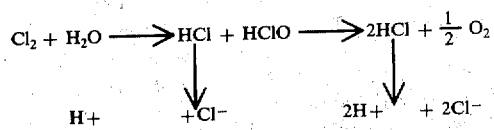

The table above shows that more dissolved chlorine $Cl_2$ appears in those bottles in which a catalyst was absent, while in the presence of a catalyst, greater concentrations of hydrogen ion, (H+), are formed, as calculated from the pH, and this hydrogen ion can only be due to the reaction of chlorine with water, in the circumstances of this example. Evidently the wetproofed catalyst accelerates the reaction of chlorine with water, causing relatively little dissolved, unreacted chlorine to remain. The sparger, by introducing chlorine under the floating catalyst, evidently succeeds to a degree in bypassing the catalyst, allowing unreacted chlorine to exist in solution under the catalyst with which it presumably has had no opportunity to make contact.

EXAMPLE 19

Reduction of Ceric Acid Sulfate by Hydrogen

Portions of 100 ml. each of aqueous ceric acid sulfate solution were placed in four matched 250 ml. glass Erlenmeyer flasks, and were exposed to similar hydrogen atmosphere by virtue of being connected in series. Each flask was closed with a rubber stopper, through holes in which were passed two bent glass tubes, one tube serving as the entrance for the stream of gas, the other tube serving as the exit. In three of the flasks, the entrance and exit tubes merely passed through the stoppers but did not extend to the contained solution, while in one of the flasks the entrance tube was long enough to pass below the surface of the contained solution and terminated in a fritted glass diffuser, that is, a sparger. The exit tube was the same as in the other flasks. The solution was prepared by dissolving 40 grams of ceric acid sulfate, $Ce(HSO_4)_4$, in 960 grams of distilled water, and adding 20 grams of concentrated sulfuric acid. On the surface of solution in one of the flasks was floated 4 grams of polyethylene beads. On the surface of solution in another flask was floated 4 grams of activated carbon wetproofed with PTFE. A third flask was closed with the stopper containing a sparger. The flasks were connected in series with plastic tubing, the exit tube of one to the entrance tube of the next, in the sequence indicated in the table below. A tank of hydrogen gas was connected to the entrance tube of the first flask. Hydrogen flow was started at the rate of about 100 ml. per minute into the first flask, and continued for about four hours while the flasks were closely observed. The results are summarized in the following table:

| Flask Position | Distinguishing Factor | Observations |
|---|---|---|
| 1 | Plain | Solution appearance remained unchanged, clear, yellow |
| 2 | PE Beads | Solution appearance remained unchanged, clear, yellow |
| 3 | Wetproofed catalyst | Yellowish-white precipitate visible in 15 min., accumulating for about 2½ hours |
| 4 | Sparger | Cloudiness visible in one hour, intensifying and accumulating very slowly. |

In contrast to the high solubility of ceric sulfate or acid sulfate in water, cerous sulfate has a low solubility. While the exact composition of the precipitate may be in doubt, the appearance of an insoluble material in the acidic sulfate solution is believed to constitute proof of the formation of a compound of cerium in which the valence is three, reduced from the valence of four of the starting material. Expressed in terms of sulfates of cerium, the essential reduction signified by the appearance of a precipitate may be represented by the following equation: $2Ce(HSO_4)_4 + H_2 \rightarrow Ce_2(SO_4)_3 + 5H_2SO_4$. Evidently the wetproofed catalyst has substantially accelerated the reaction between hydrogen gas and the ceric solution, even though the catalyst floated on a quiescent surface. Bubbling hydrogen gas through the ceric solution with a sparger accelerated the reaction in comparison to quiescent surfaces without a catalyst. The visual analysis afforded by the appearance of the precipitates suggested that the reaction was proceeding several-fold more rapidly with the catalyst than it was with the sparger.

EXAMPLE 20

Oxidation of Benzaldehyde by Air to Benzoic Acid

Portions of 20 grams each of benzaldehyde were placed in matched 50 ml. glass beakers. On one of the beakers was floated one-half gram of activated carbon wetproofed with chromium-complexed fluorocarbon. After exposure to ambient air for about 20 hours, the benzaldehyde under the floating carbon contained many crystals of a solid material, clinging to the sides and bottom of the beaker. The benzaldehyde with no carbon was unchanged in appearance. The floating carbon was removed from the one portion of benzaldehyde, and both beakers were left exposed to ambient air for an additional several days, during which time the liquid material disappeared entirely, and no odor of benzaldehyde was discernible in either beaker. In the beaker without carbon, a very thin yellow layer remained, while in the beaker which had contained the floating carbon, there was a large deposit of white crystalline material. A sample of this crystalline material was incorporated in a potassium bromide pellet by a standard procedure, and the infrared absorption spectrum recorded. The absorption peaks were those associated with benzoic acid, while the absorption ordinarily ascribed to benzaldehyde was lacking.

It is believed that the benzaldehyde was oxidized by air to form benzoic acid, according to the equation: $C_6H_5CHO + \frac{1}{2}O_2 \rightarrow C_6H_5COOH$. In the absence of the floating catalyst, the oxidation evidently occurred to a negligible degree, while the presence of the floating catalyst so accelerated the rate of oxidation that the conversion to benzoic acid was substantial. Although the product was not weighed, the visual estimate of the mass of crystals would make a yield of 10 percent or better seem likely.

Referring to FIG. 4, a container 30 is provided with an inlet 31 for introducing one fluid reactant 32 and an outlet 33 for removing the reaction products and unreacted fluid reactant. Positioned within the container 30 is screen element 34 arranged with respect to the level of reactant 32 in the container 30 so as to contact the under side of the screen 34, and by proportioning the thickness of the bed of catalyst 35 so that its vertical height is greater than the capillary rise of the reactant, thus preventing flooding of the catalyst by the reactant, the free surface portion 36 of the catalyst is continually exposed to a second reactant and operates in essentially the same manner as a floating bed. As described previously, the one fluid reactant may be the reductant, i.e., a liquid and the other reactant may be the oxidant, i.e., a liquid or gas. The catalyst 35 may take several forms in the arrangement of FIG. 4, for example, a porous carbon plate made up of bonded porous carbon particles which are supported either by a screen or some other convenient arrangement. Depending upon size, cross-section and strength of the plate, it can be fabricated to be self-supporting thus eliminating the use of supporting screens and other structures. This arrangement, like those previously described, assures that any oxidant contacting the reductant must also come in contact with the catalyst, thereby establishing the reaction zone.

Another form of the apparatus is shown in FIGS. 5 and 6 in which the reactor 45 is particularly suited for continuous systems using a liquid reactant and a gaseous reactant, and which includes a plurality of vertically stacked tray elements 46 supported in spaced relation by members 47. In the embodiment shown, there are four trays although it is understood that a greater or lesser number of trays may be used. Each tray is provided with a plurality of spaced divider elements 48 extending from one wall 49 of the tray. The divider elements 48 terminate short of opposing wall 51. Extending from opposing wall 51 is a second plurality of divider elements 53, these terminating short of the wall 49. Liquid reactant is introduced into the tray through an inlet 55, and due to the arrangement of dividers 48 and 53, travels in a serpentine fashion to tray outlet 56 which permits the liquid reactant material to flow into the next lower tray. In this manner, the liquid reactant travels from one tray to the next and is finally withdrawn through an exit line 57.

The reaction is carried out in the presence of a catalyst which may, for example, be PTFE wetproofed particulate carbon which floats on the surface of the liquid reactant much in the same fashion described in connection with FIG. 3. The apparatus of FIGS. 5 and 6, however, represents a continuous system in which fresh liquid reactant is introduced in the inlet 55 and removed at the outlet 57. The catalyst which is in particulate form is prevented from migrating through the reactor by baffle elements 60, so positioned in the path of liquid reactant travel to permit passage thereof thereunder while maintaining the catalyst stationary. The other reactant is a gas circulated between the trays.

EXAMPLE 21

Oxidation by Air of Sodium Sulfide

An apparatus was constructed according to the description of FIGS. 5 and 6, consisting of eight trays stacked with space between, each tray having dimensions of 2 feet × 4 feet × 2 inches deep, and being partitioned so that the serpentine path through each tray was about 27 feet long. The trays were connected in series, so that liquid introduced into one corner of the top tray travelled through the serpentine path of every tray, and flowed out from a corner of the bottom tray. The floating catalyst consisted of particulate activated carbon wetproofed with 2% of polyethylene placed in a layer in each tray.

In a first instance, the reductant solution consisted of aqueous sodium sulfide, approximately 2 molar in concentration, flowing through the apparatus at a rate of about 430 to 490 cc. per minute . Continuous opertion was maintained for 5½ hours. At the end of that time, samples were systematically taken of the effluent from each tray, and analyzed by standard procedures to determine sulfide, sulfur, and thiosulfate. The initial state of sulfur is as sulfide, and by oxidation it may be converted to elemental sulfur dissolved as polysulfide, and further to thiosulfate. The analysis showed no thiosulfate present, only sulfide and elemental sulfur dissolved as polysulfide, the latter referred to in the analytical results simply as "sulfur". The following table summarizes the typical analytical results of samplings at each level, expressed as grams per liter of sulfur:

| Tray No.: | Feed | 1 | 2 | 3 | 4 | 5 | 6 | 7 | 8 |
|---|---|---|---|---|---|---|---|---|---|
| Sulfide : | 64.6 | 59.0 | 51.0 | 43.9 | 34.6 | 31.1 | — | 27.2 | 25.3 |
| Sulfur : | None | 5.1 | 12.5 | 19.9 | 28.2 | 33.0 | — | 36.2 | 37.2 |

In a second instance, the reductant solution consisted of aqueous sodium sulfide approximately one molar in concentration, flowing through the apparatus at a rate of 400 cc. per minute. A typical sampling from a 28 hours period of continuous operation is summarized in the following table. As before, no thiosulfate was found in any of the samples, and sulfide and sulfur are expressed as grams per liter of sulfur:

| Tray No.: | Feed | 1 | 2 | 3 | 4 | 5 | 6 | 7 | 8 |
|---|---|---|---|---|---|---|---|---|---|
| Sulfide : | 31.9 | 25.8 | 20.4 | 17.0 | 14.9 | 13.3 | 12.3 | 11.5 | 10.7 |
| Sulfur : | None | 5.9 | 10.9 | 14.2 | 15.9 | 16.5 | 18.4 | 19.1 | 19.9 |

In both of these instances the average dwell time of reductant solution within the apparatus is less than two hours, and experience has shown that exposure of sodium sulfide solutions to air without a catalyst produces negligible oxidative reaction even in many times this length of exposure. Furthermore, the accomplishment of oxidative reaction in this apparatus is relatively rapid compared to a reductant solution standing quiescent under a floating catalyst.

Another form of reactor is illustrated in FIG. 7 in the form of a column 65 of cylindrical shape. Reductant is introduced through an inlet which may be 66 or 67 and unreacted reductant and product withdrawn from an outlet which may be 67 or 66 depending on whether the liquid is flowing downward or upward, respectively. Oxidant may be introduced through conduit 68 and 69 depending on whether concurrent or countercurrent flows are desired. Supported within the column is catalyst 70 preferably in the form of particulate carbon which is maintained in a position by screens 71 and 73. The catalyst 70 is maintained in a non-flooded condition, in this embodiment, by wetproofing the particulate carbon as heretofore described. It will be apparent to those skilled in the art that various modifications may be made of the device shown in FIG. 7, for example, the catalyst may be in the form of a wetproofed mass of adhered particulate carbon, or the other materials previously described may be used. Other forms of members may be used to hold the particulate material stationary, and the column may be arranged vertically, as shown or horizontally or at an angle therebetween with the catalyst wetproofed for the purpose of providing a reduction-oxidation reaction zone at the locus of the contact between the catalyst, oxidant and reductant thereby preventing substantial reaction at other than the reaction zone.

EXAMPLE 22

Oxidation by Air of Sodium Sulfide, Column, Reactor, Countercurrent Flow

An apparatus was constructed according to FIG. 7, in which the column 65 was a glass tube of 1⅜ inches inside diameter. Reductant was introduced through an inlet at the top, 66, and the product was withdrawn from an outlet 67. Air was introduced through conduit 69, from a pump which provided a uniform flow rate, in countercurrent flow. The catalyst 70 consisted of a bed, hereinafter described, 16 inches in depth. The bed was supported by a screen in the bottom of tube 65, above the inlet 66 and the outlet 67. The activated carbon was wetproofed by treatment with 2, 5 and 10 percent of PTFE, respectively, and these three catalysts were compared with each other and with the same activated carbon without wetproofing treatment, in a series of experiments. The reductant consisted of an aqueous solution of sodium sulfide, approximately two molar in concentration. The dwell time of reductant solution in the bed was calculated from the dimensions and the throughput, and was varied by altering the rate of throughput of reductant. Samples of effluent were taken for analysis when steady conditions had been reached after each change, and they were analyzed by standard procedures for sulfide, elemental sulfur dissolved as polysulfide, and thiosulfate. The analytical results from this series of experiments are summarized in the following table, in which the concentration in grams per liter of each product species is expressed as sulfur equivalent:

| Dwell Time -minutes | 33 | 47 | 53 | 64 | 69 | 72 | 77 | 84 | 102 |
|---|---|---|---|---|---|---|---|---|---|
| *Activated Carbon without Wetproofing* | | | | | | | | | |
| Sulfide | | 50.6 | | | | | 53.1 | | |
| Sulfur | | 1.9 | | | | | 1.6 | | |
| Thiosulfate | | 0.0 | | | | | 1.3 | | |
| *Activated Carbon with 2% PTFE* | | | | | | | | | |
| Sulfide | 40.6 | 32.3 | | | 18.2 | | | | |
| Sulfur | 14.1 | 24.3 | | | 25.9 | | | | |
| Thiosulfate | 1.3 | 2.6 | | | 10.2 | | | | |
| *Activated Carbon with 5% PTFE* | | | | | | | | | |
| Sulfide | 35.2 | 25.9 | | | 17.9 | | | | |
| Sulfur | 21.4 | 28.2 | | | 32.6 | | | | |
| Thiosulfate | 2.6 | 9.0 | | | 16.6 | | | | |
| *Activated Carbon with 10% PTFE* | | | | | | | | | |
| Sulfide | | 36.2 | 27.2 | | | | | 18.6 | 11.8 |
| Sulfur | | 24.6 | 29.1 | | | | | 34.6 | 27.5 |
| Thiosulfate | | 0.0 | 0.0 | | | | | 7.7 | 35.8 |

Initially, the concentration of the reductant "sulfide" was about 64 grams per liter, and the concentration of the oxidation products "sulfur" and "thiosulfate" were practically zero. It will be noted above that as the dwell time increases, the "sulfide" is decreasing and the "sulfur" and "thiosulfate" are increasing. It will be further noted that oxidation occurs only slowly when the activated carbon is without wetproofing, even though the oxidant, air, is present and particulate activated carbon is present. In the absence of wetproofing only three phase mutual contact is missing, so that under these conditions there is no reduction-oxidation reaction zone in the sense of this invention.

EXAMPLE 23

Oxidation by Air of Sodium Sulfide and of Ferrous Sulfate, Column Reactor, Countercurrent Flow Another apparatus was constructed according to FIG. 7 and operated as described in Example 22, except that the glass tube forming column 65 was one inch in diameter, and the bed was filled to a depth of 28 inches. Also in this column, the liquid outlet was connected to a standpipe whose overflow was at the level of the top of the bed. Liquid introduced through the top flowed downward through the bed, countercurrent to the air flowing upward, but the standpipe outside of the column maintained a hydrostatic head and prevented liquid inside the column from draining out, except as inflowing liquid displaced it through the standpipe. Experiments were made with two reductant solutions, one being aqueous sodium sulfide approximately two molar in concentration, and the other being ferrous sulfate approximately one molar in concentraton. Each of the reductant solutions was tested with each of two particulate activated carbons contained in the tube in a bed 28 inches in depth, in separate experiments, one of the particulate activated carbons being an as-received product, and the other being the same product wetproofed by treatment with 10% by weight of PTFE. In each case, the reductant solution was passed through the column at a constant rate as noted, and samples were taken for analysis when the operation of the column was steady. In all cases, air was passed upward through the column at room temperature and at a rate of 250 cc. per minute. The results of these four experiments are summarized in the following tables:

| Sodium Sulfide Solution | | | | |
|---|---|---|---|---|
| Activated Carbon as Received | | | | |
| Flow Rate (gms/hr): | 391 | 312 | 192 | 48 |
| Sulfide (g/l as S): | 63.3 | 63.1 | 58.9 | 57.4 |
| Sulfur (g/l as S) : | 1.0 | 0.5 | 0.5 | 1.0 |
| Thiosulfate (g/l as S) : | none | none | 2.5 | 2.5 |

| Activated Carbon Wetproofed with 10% PTFE | | | | | | |
|---|---|---|---|---|---|---|
| Flow Rate (gms/hr): | 54 | 26 | 444 | 308 | 226 | 140 |
| Sulfide (g/l as S): | 3.7 | 1.9 | 36.6 | 31.08 | 25.4 | 9.9 |
| Sulfur (g/l as S) : | 11.8 | 8.5 | 17.9 | 26.6 | 32.8 | 31.8 |
| Thiosulfate (g/l as S) : | 42.9 | 50.6 | 3.2 | none | none | 21.8 |

The "sulfide" reductant was at an initial concentration of about 64 g/l as S, with practically no "sulfur" and "thiosulfate" initially. The concentration of "sulfide" reductant remains high in the case of the activated carbon as received showing that relatively little oxidative reaction occurred, compared to the case in which the activated carbon was wetproofed. The lower values of flow rate result in a longer dwell time of the reductant solution within the activated carbon bed, and correspondingly more reaction occurs.

| Ferrous Sulfate Solution | |
|---|---|
| | Activated Carbon as Received |
| Flow Rate (gms/hr.): | 27 |
| Ferrous Iron (Equivalents/liter) | 1.10 |
| Ferric Iron (Equivalents/liter) | 0.04 |
| Activated Carbon Wetproofed with 10% PTFE | |
| Flow Rate (gms/hr): | 29 |
| Ferrous Iron (equivalents/liter) | 0.65 |
| Ferric Iron (equivalents/liter) | 0.62 |

The "ferrous iron" reductant was at an initial concentration of about 1.25 equivalents per liter, with very little "ferric iron" present. Passing the reductant through the column packed with activated carbon as received caused very little oxidation by air to occur, as shown by the small concentration of "ferric iron" produced, while the same operation through the column packed with wetproofed activated carbon caused almost half of the "ferrous iron" to be oxidized by air to "ferric iron".

Referring to FIGS. 8 to 10, a closed tower reactor 75 is shown and includes a plurality of vertically stacked tray elements 76, four being shown, although more or less may be used, as desired. In this arrangement, each tray of polypropylene, stainless steel or other suitable material includes a plurality of spaced divider elements 77 extending from one end wall 78 and terminating short of the other end wall 79. Extending from wall 79 are a second series of spaced divider elements 80 which terminate short of wall 78. The divider elements 77 and 80 form flow channels for the reductant and oxidant. The gaseous reactant is introduced through inlet 81 provided in the top cover 82 while the liquid reactant is introduced through inlet 84 also in the top cover. A liquid reactant inlet chamber 85 is formed by baffles 86 and 87 which span the space between the adjacent side wall and the adjacent divider element 80. The baffles terminate short of the cover 82 so as to provide a space for passage of gaseous reactant, while baffle 87 is spaced from the bottom of the tray to permit flow of the liquid reactant under the baffle. Adjacent to the liquid reactant inlet chamber is a gas inlet chamber 88 defined by the baffle 86 and end wall 79.

Unreacted liquid reactant and product and some gaseous reactant are withdrawn from an outlet 89 provided in chamber 85a formed by baffles 86a and 87a corresponding in structure to baffles 86 and 87. The top of outlet 89 extends above the bottom of baffle 87a, as illustrated in FIG. 10, in order to raise the level of liquid reactant such that the catalyst 90 in the form of wetproofed particulate carbon is prevented from flowing from one tray to the next Gaseous reactant passes over the tops of baffles 86a and 87a to an outlet chamber 88a and through the outlet 91 to the next lower tray. For simplicity each tray is of essentially the same construction, with the passageways 89a and 91a at the inlet end of the tray being plugged or sealed as shown in FIG. 9. Thus, as reactants flow into the next lower tray, both travel in a direction opposite that of the tray above and exits through chambers corresponding in location and structure to chambers 85a and 88a. At the last tray, unused gaseous reactant, if any, and the remaining gases are withdrawn from tower outlet 92 while unused liquid reactant and products are withdrawn from tray outlet 93.

The cover 82 is so sealed to the top tray by seal elements as to form a continuous flow channel formed by the dividers and walls, as indicated in FIG. 8. The bottom of the top tray forms the cover for the tray below it, the top tray being provided with a separate cover. The trays are sealed by seal elements 95 which may take various forms. In the form illustrated in FIGS. 8-10, the seal elements are in the form of resilient members adhered to the top of the dividers 77 and 80 and to the top of the side and end walls of each tray. In this way positive control of gas feed rate can be maintained and the system may be pressurized if desired.

EXAMPLE 24

Oxidation by Air of Sodium Sulfide in Closed Tower of Stacked Trays

An apparatus was constructed according to FIGS. 8 and 10, containing six trays in closed-tower stacked configuration, each tray being four feet long, two feet wide and two inches deep, with partitions such that liquid reductant flowed through each tray in a serpentine path about 27 feet long. Air oxidant was fed at a rate of 44 liters/minute, while the reductant was fed at the rate of 400 cc/minute. The reductant was an aqueous solution of sodium sulfide approximately two molar in concentration. Activated carbon wetproofed with 1% of PTFE was used as the catalyst and was floated on the surface of the aqueous sodium sulfide in each of the trays. At this rate of flow of reductant, the average dwell time of reductant within the apparatus was about 90 minutes total, or about 15 minutes in each tray. The apparatus was operated continuously for about six hours, and at the end of that time the effluent from each tray was sampled and analyzed. The reductant was sodium sulfide, which was oxidized to give the products, elemental sulfur dissolved as sodium polysulfide, and sodium thiosulfate. The analytical results are expressed as grams/liter of sulfur in each of the three forms, sulfide, sulfur and thiosulfate. Typical results from this run are shown in the following table:

| Tray No. : | 1 | 2 | 3 | 4 | 5 | 6 |
|---|---|---|---|---|---|---|
| Sulfide (g/l as S): | 62.1 | 60.5 | 57.4 | 52.5 | 45.1 | 28.2 |
| Sulfur (g/l as S) : | none | none | 1.6 | 3.5 | 11.2 | 28.5 |
| Thiosulfate (g/l as S) : | none | none | 3.0 | 6.5 | 20.0 | 50.2 |
| Temperature (° F) : | 138 | 136 | 147 | 183 | 195 | 193 |

The temperatures shown above indicate the heating caused by the reaction. The temperature may be reduced by increasing the flow of air, thereby dissipating the heat of reaction into the increased volume of gas. As long as oxygen is being supplied in excess of that needed for the oxidative reaction, the temperature may be raised by decreasing the flow of air, thus dissipating the heat of reaction into a smaller volume of gas. The ability to thus control the volume of gas passing through the apparatus, with the resulting ability to control the temperature, is one of the useful characteristics of the closed-tower stacked configuration of trays.

EXAMPLE 25

Liquid/Liquid Reaction between Nitrobenzene as Oxidant and Aqueous Sodium Sulfide as Reductant Into each of two 250 ml. glass beakers were placed 100 gram portions of an aqueous sodium sulfide solution. On top of each portion was poured 50 grams of nitrobenzene, which formed an immiscible floating layer. The beakers were placed on a hotplate and heated so that the temperature of the contents was 200° F. Into one of the beakers was poured 3 grams of activated carbon treated with 2% of PTFE. The carbon fell through the hot nitrobenzene and positioned itself at the interface between the nitrobenzene and the sodium sulfide solution. Over each beaker was set a watchglass filled with water, to reduce evaporation, and the beakers were allowed to stand for 15 hours on a hotplate, with the contents at a temperature of about 200° F. At the end of this time, the nitrobenzene layers and the aqueous layers showed colors in varying degrees, of yellow to red-orange shades, with colors of deepest intensity in the beaker containing the carbon. The aqueous layers were separated from under the nitrobenzene layers, and portions of each were quantitatively analyzed by titrations for their sulfide, sulfur dissolved as polysulfide, and thiosulfate content, while other portions were extracted with ethyl ether. When the ethyl ether extracts were evaporated, a deposit of brilliantly orange-red colored crystalline material was left. A conspicuous difference was observed in the quantity of crystalline material, that from the no-carbon reaction beaker being a slight amount and that from the carbon-containing reaction beaker being a greater amount by a factor which appeared to the eye to be about ten-fold. Samples of these crystalline materials were examined by infra-red absorption spectroscopic analysis, using standard techniques, and the materials were found to have the infra-red absorption characteristics only of azoxybenzene. Samples of the nitrobenzene layers were similarly examined by infra-red absorption spectroscopic analysis, with a film of the nitrobenzene liquid supported between silver chloride pellets in the spectrometer. The orange constituents in the nitrobenzene layers were present in quantity too small to give detectable characteristic infra-red absorption, but the characteristic absorption of aniline was found in, and only in, the sample from the no-carbon reaction beaker.

Because the presence of air in the above example may conceivably introduce another oxidant besides nitrobenzene into the system, the example was partially repeated under an atmosphere of nitrogen. Into each of two 250 ml. glass beakers were placed 100 gram portions of the aqueous sodium sulfide solution, and on the side of each beaker was hung a small nozzle discharging nitrogen gas into the beaker at a flow rate of about 10 cc. per minute. This nitrogen flow was maintained throughout the period of the test. Two portions of 50 grams each of nitrobenzene were weighed into separate beakers, and the two aqueous portions and the two nitrobenzene portions were set on a hotplate and heated until the temperatures of the contents were 200° F, and then the nitrobenzene portions were poured into the aqueous portions, forming on each an immiscible floating layer. Into one of these beakers was poured 3 grams of activated carbon treated with 2% of PTFE, which fell through the nitrobenzene and positioned itself at the interface between the nitrobenzene and the sodium sulfide solution. These beakers were allowed to stand on the hotplate, maintaining the temperature of the contents at 200° F. By insertion of a pipette through the nitrobenzene layers, samples of the underlying aqueous layers were withdrawn at intervals of about one and about four hours, and analyzed for sulfide, sulfur dissolved as polysulfide, and thiosulfate, as before. By the end of five hours, yellow to orange-red colors were strongly developed with colors of the deepest intensity in the beaker containing the carbon. A composite ether extract of water and carbon layers was added to the nitrobenzene and the ether was evaporated from the nitrobenzene layers and a five gram portion of each nitrobenzene layer evaporated at room temperature in open air to obtain the relative amounts of solid material and their appearance.

All of the results of the example are summarized in the following table:

| Distinguishing Factor | Aqueous Layer | | | | Relative Amounts of Azoxybenzene Extracted | Nitrobenzene Color | Evaporated Residue | |
|---|---|---|---|---|---|---|---|---|
| | Sulfide | Sulfur | Thio-Sulfate | Equivalent Oxygen Consumed gms/liter | | | Weight | Color |
| | (grams/liter as sulfur) | | | (In Presence of Air) (After Fifteen Hours) | | | | |
| No Carbon | 6.7 | 13.4 | 51.7 | 58.4 | Trace | Orange-Yellow | .024 gms. | Orangish brown, Uniform |
| Carbon at Interface | 2.6 | 8.0 | 64.0 | 68.0 | Considerable | Deep red-orange | .142 gms. | Yellow & Orange Materials |
| | | | | (Air Excluded by Nitrogen) | | | | |
| No Carbon After 1 hr. | 50.5 | 6.7 | 14.1 | 17.5 | | Orange-Yellow | .030 gms. | Orangish brown Uniform |
| After 4 hrs. | 183 | 36.3 | 19.2 | 37.4 | | | | |
| Carbon at Interface After 1.75 hrs. | 44.7 | 16.0 | 14.7 | 22.7 | | Red-Orange | 0.67 gms. | Yellow & Materials |
| After 4.5 hrs. | 16.9 | 34.7 | 28.8 | 46.2 | | | | |

Referring to the table above, the equivalent oxygen consumed, in grams per liter, indicates the amount of oxidation accomplished upon the aqueous reductant. In each of the three pairs of comparable figures, the equivalent oxygen consumed was greater in the presence of the carbon at the interface than in its absence. The amount of reduction accomplished upon the nitrobenzene oxidant was not measured, but the evidence of the color is that the presence of the carbon at the interface caused more rapid formation of azoxybenzene than occurred in the absence of the carbon at the interface. Azoxybenzene is the only expected product to have the observed orange-red coloration, the alternate reduction products from nitrobenzene, namely, hydrazobenzene, azobenzene and aniline being colorless or only of slight color. The appearance of aniline in the nitrobenzene layer without carbon suggests a tendency for the reaction to proceed all of the way to the most reduced product, namely aniline, in contrast to a tendency in the presence of a contacogen to preserve products in an intermediate state of reduction, namely azoxybenzene, this latter being true even though the total reduction accomplished, which should be equivalent to the demonstrated total oxidation accomplished in the time intervals shown, is greater in the presence of the contacogen.

The rate and/or efficiency of the system of the present invention may be increased by use of inclusions and the like with the catalyst. For example inclusions of metals and compounds of metals in the particulate carbon appear to increase the rate of reaction over that which occurred using the same carbon without inclusions. The inclusions may be provided as described in the following:

Cobalt sulfate was dissolved in water in the ratio of 0.5 grams per 100 milliliters of water. Particulate carbon was added in an amount of 10 grams per 100 milliliters of solution. The resultant mixture was heated to boiling and then dried in an oven at 110° C. The solid material was then treated with sodium hydroxide to precipitate an insoluble cobalt material, the solids thereafter filtered and washed with 0.1 normal sodium hydroxide. The carbon was then soaked in sodium sulfide solution for four hours filtered and washed with hot water three times and then dried again at 110° C.

Manganous nitrate was dissolved in slightly acidic solution in the ratio of 0.5 grams per 100 milliliters of water acidified with 0.1 grams of nitric acid. The remaining treatment was the same as described in connection with cobalt sulfate.

The same procedure described immediately above was utilized except that the inclusion was derived from ferric sulfate dissolved in 0.1 normal sulfuric acid.

Nickel sulfate, silver nitrate, and chloroplatinic acid were individually used and processed to form inclusions as above described.

All such inclusions were observed to increase the rate of the reaction over that attained without the inclusions.

The previously described specific examples are representative of those thermodynamically spontaneous reactions which can be conducted in accordance with the present invention. From the above description of the principles and operation of the present invention, it will be apparent to those skilled in the art that various other reactants and materials may be used in carrying out the invention.

Thus, by way of further explanation it is pointed out that the invention relates to a domain related to heterogeneous catalysis, i.e., the catalyst and reactants being in different phases, in the sense that the catalyst is a solid phase present in a reaction system which contains two or more fluid phases, for example, a gas and a liquid, two immiscible liquids, or a gas and two immiscible liquids, but differs in that in the heretofore known heterogeneous catalysis systems in the reaction system, the catalyst is in a flooded state, i.e., completely wetted by one of the phases. The wetproofed solid catalyst, or catalysts, will not so wet.

The catalyst forms the principal location at which the reaction takes place. At the catalyst, each reactant contacts the catalyst and comes into contact with the other reactant, the reaction product or products being formed at the catalyst. The catalyst is preferably in particulate form and includes surface portions which are treated to prevent exclusive wetting by any one fluid phase of the two or more fluid phases present.

In effect, the wetproofed catalyst operates to promote controlled contact between the reactants in addition to its catalytic function. By way of example, in a liquid-gas reaction system, the wetproofed catalyst forms the locus of interfacial contact at which the reaction takes place, and since it is not flooded, the interfaces liquid/- catalyst, gas/catalyst and gas-liquid co-exist in proximity. Ordinarily, the liquid phase will displace the gas phase, and, therefore, prevention of flooding by the liquid is the principal concern. Catalysis is generally dependent upon an adsorptive step, and the existence of a gas/catalyst interface assures that gas adsorption may take place without the rate limiting step of diffusion through a liquid film in order for the gas to reach the catalytic surface.

A solid catalyst treated in such a way that the liquid will wet only part of the surface, and the gas will be in contact with another part of the surface, becomes a wetproofed catalyst. It is desirable that the respective portions of the surface be distributed throughout the entire surface area, so that any small area of surface of a size, for example, resolvable by unmagnified visual observation, include a portion which is wetted by the liquid and another portion which is in contact with the gas but not wetted by the liquid.

The solid heterogeneous catalyst may be used with systems which contain a homogeneous catalyst. When used with a homogeneous catalyst, the heterogeneous catalyst may cooperate with the homogeneous catalyst be adsorbing at least a portion of the homogeneous catalyst upon the heterogeneous catalyst surface.

By contrast, if a heterogeneous catalyst is flooded by the reaction liquid, then the rate of reaction may be slowed because of interference with the steps generally taking place in heterogeneous catalysis, particularly, (a) diffusion of reactants to, and products away from, the surface of the catalyst, (b) adsorption of reactants and desorption of products, and (c) surface reaction of adsorbed reactants. In part, the rate-limiting step is the additional time needed for reactants to diffuse through the liquid film which floods the catalyst, as well as diffusion of products out of the film. The wetproofing treatment of this invention, when used in the manner described, substantially eliminates those rate-limiting steps which include diffusion through liquid films on the catalyst surface.

In the case of homogeneous catalysis, that is where there is catalyst dissolved in a liquid phase, the reaction system may not in itself be homogeneous, but may be, for example, gas-liquid, and the heterogeneous catalyst operates, by absorption or adsorption of the homogeneous catalyst, to position the homogeneous catalyst at an interface accessible to the reactants. Since the catalyst is not flooded, it provides a medium by which the reactants can come into contact with each other and with the homogeneous catalyst which is now present on the heterogeneous catalytic surface.

As noted in the drawings, the reactor itself may take various geometric shapes but essentially includes a reaction chamber equipped with means to introduce the reactants simultaneously or separately. The reaction chamber also includes means to remove the reaction product, which means may, for example, allow for removal of a portion of the fluids in the reactor, the fluids being treated to separate the reaction product with the residue being cycled back to the reaction chamber. Various auxiliary equipment may be used with the reactor for the purpose of temperature control, e.g., a heat exchanger to increase or decrease the temperature either uniformly in the reactor, in stages, or in zones, as the case may be. Likewise, stage reactor may be used. Other auxiliary equipment may include pressure control equipment for increasing or decreasing the pressure above ambient, e.g., 350 psig or more at a reduced pressure. The reaction chamber may be of various metals, or lined in accordance with the usual practice. Essential in the operation of the reactor of this invention is the wetproof catalyst.

In addition to the electronically conductive solid materials previously mentioned, various other solid catalysts may be used. Typical of the catalysts which may be used are carbon, activated carbon, nickel, titanium sponge, or a catalytically active or catalytically inactive substrate containing inclusions such as nickel, iron, cobalt, platinum, palladium, rhodium, and other platinum group metals, silver, gold-platinum alloy, manganese oxides, (e.g., manganese dioxide), manganese sulfides, iron oxides or hydrated oxides, nickel oxide, nickel sulfide and cobalt sulfide or mixtures thereof. The support for the inclusions may be carbon, activated carbon, asbestos, silica, silica gel, alumina, ceramics, etc. The solid catalyst may be a single species catalyst, such as powdered carbon or platinum, or it may be a catalyst on a catalytically inactive substrate, or it may be a catalytic substrate on which additional catalysts, either homogeneous or heterogeneous, are contained.

An important aspect of the present invention is treating the catalyst with a wetproofing agent to prevent the catalyst from being in exclusive contact with only one of the contained fluid phases, of the two or more fluid phases present. When used in describing this invention, the term "flooded" means that the catalyst is in exclusive contact with one of the fluid phases. If the catalyst is flooded, the increase in rate of product formation is not achieved.

The kinetics of the reactions involved are not sufficiently defined or understood as to provide a complete explanation of the reaction mechanism. Basically it is a contact catalysis wherein the solid wetproofed catalyst is in the presence of two or more fluid phases. However, the reaction rates achieved with such a wetproofed catalyst are greatly in excess of those achieved with an ordinary contact catalyst. Therefore, characterization by a term such as heterogeneous or contact catalysis does not provide a complete explanation or understanding of the reaction mechanism.

Regardless of whether the explanation of the reaction mechanism is based on catalysis, electrochemistry or some combination of disciplines, the data support the proposition that the present invention involves a basically new concept and mode of operation in preparation of chemical materials by use of a new reactor. This new operation involves the controlled contact of reactants and catalyst in which the contact is primarily at a locus of interfacial contact between the fluid phases and the solid catalyst.

Since the reaction zone involves controlled contact between the fluid phases and the catalyst, the catalyst must be in contact with each fluid phase and wetted by each but flooded by neither. Wetted, as used here, means that the contact angle between the catalyst and the principal liquid is low, e.g., less than about 90° and approaching zero. Since the reactor of this invention may be used in gas-liquid, gas-liquid-liquid, with any number of additional liquids present, immiscible liquid-liquid, and gas-gas systems, the latter with a liquid to provide two immiscible fluid phases, the term principal liquid is used to mean that liquid most likely to flood the catalyst. Ordinarily the liquid present will displace any gas around the catalyst, this becoming the principal liquid. If the catalyst is wetted by a gas which will not be easily displaced, parts of the catalyst must be made lyophilic in order to encourage displacement of the gas with the liquid present. Other parts are wetproofed against the liquid as indicated below. If the contact angle is high, e.g., greater than about 90° and approaching 180°, then the principal liquid will tend to draw away from the surface of the catalyst, and the surface of the catalyst in in effect in substantial contact only with the gas, or with the other liquid, that is, flooded by the gas, or by the other liquid. On the other hand, with the surface of the catalyst readily wetted by the principal liquid, that is, with a contact angle approaching zero between the catalyst surface and the principal liquid, the principal liquid will tend to cover the surface of the catalyst, and the surface of the catalyst is in effect in substantial contact only with the principal liquid, that is, "flooded" by that liquid.

The method of preventing flooding by the principal liquid is by the treatment of the catalyst designated as "wetproofing". This creates on the surface of the catalyst areas not wetted by the principal liquid, i.e., the contact angle between this inert coating and the principal liquid is greater than about 90°. That is, the wetproofing agent on the surface, with a lower surface energy than the principal liquid, lowers the surface energy of the areas of the solid catalyst coated with the wetproofing agent to a surface energy less than that of the principal liquid which would otherwise flood the catalyst. Thus, when another phase is present, that phase will readily displace the principal liquid in the treated areas resulting in the requisite locus of interfacial contact. It is important that the coating of the wetproofing agent be discontinuous (so as not to completely encapsulate the catalyst in an impermeable film) so that areas of the catalyst surface are available to the fluid reactants.

Thus, the surface of the catalyst is so treated that part is wetted by one fluid phase and part by another fluid phase, insuring thereby that respective portions of the catalyst are directly in contact with one or the other of the at least two fluid phases, and the reactants in such phases are in contact with each other and with the catalyst.

Further illustrations of the thermodynamically spontaneous reactions which are encompassed by this invention are the following reactions:

s. Hydration of propylene to isopropanol. Other hydration reactions include ethanol from ethylene, t-butyl alcohol from isobutylene, t-amyl alcohol from trimethylethylene, and 2-hexanol from 1-hexene;

t. Hydration of acetylene to acetaldehyde;

u. $CO_2$ absorption in alkali carbonate;

v. Oxidation of NO to $NO_2$;

w. Reduction of NO to nitrous oxide, nitrogen, ammonia or hydroxylamine;

x. Reduction of $NO-HNO_3$ to $NH_4NO_3$ or hydroxylamine salts;

y. Reduction of $NO_2$ in $H_2SO_4$ to $(NH_4)_2SO_4$;

z. Recombination of hydrogen and chlorine gas;

aa. Recombination of hydrogen and oxygen gas;

bb. Oxidation of $SO_2$;

cc. Reduction of nitrobenzene by hydrogen to azoxybenzene, hydrazobenzene or aniline; and dd. Oxidation of unsaturated olefin gases to produce carbonyl compounds, including production of acetaldehyde from ethylene, acetone from propylene, and methyl ethyl ketone from 1-butene of 2-butene;

ee. Oxidation of alcohols to the corresponding ketones or aldehydes, such as methanol to formaldehyde, ethanol to acetaldehyde, 1-propanol to proprionaldehyde, and 2-propanol to acetone.

Other reactions of interest include odor control reactions, e.g., reduction and elimination of odor from pulping-chemical recovery systems, oxidation of carbon disulfide, and oxidation of R-SH compounds to RSSR compounds.

The reactants may be organic or inorganic materials in the form of gases, liquids, or liquid solutions. The solid catalyst is essentially inert with respect to the reactants, the products and other substances of the reaction system in the sense that it is not chemically attacked or reactive therewith. A material having a high surface-area-to-weight ratio is preferred because it furnishes greater interfacial contact.

In addition, the structure of the catalyst is chosen to promote simultaneous contact with both the reactants and may be in various physical forms to accomplish this purpose. In the case of a catalyst in particulate form, the particles are chosen to provide a large surface area, and may be, for example, individually non-porous particles of large surface area, or they may be larger particles which are porous. When the catalyst is in particulate form it may be floated on the liquid phase, may be submerged, may be in the form of a packing in a tower, or may be in the form of a bed supported, for example, by separate packing trays. When the catalyst is a plate or solid unitary member, as for example made by bonding particles together, the member is structured by maintaining porosity and large surface area. It will be apparent, accordingly, that various forms of catalyst may be used, and various configurations may be employed. The catalyst may be supported on a plate, or formed into a tube or plate, which may be stationary or movable, e.g., a rotating tube. Whatever the form, the catalyst should be, in addition to the qualities already discussed, structured to achieve a relatively high surface area and to promote simultaneous contact with the reactants.

The reactor itself may be relatively simple in configuration, e.g., cylindrical, although other shapes may be used. The reactor includes a reaction chamber which may be a portion or substantially all of the reactor. The catalyst is positioned within the reaction chamber as a bed or packing or as a slurry and may be in the form of a tower packing or separate trays supporting a bed of catalyst. In general, the reactor may be a tower configuration with the height and diameter of the tower being determined by standard chemical engineering principles. Those design parameters used in the construction of adsorption towers may also be useful in design to promote efficient mass transfer of reactants and products. In other applications design parameters used in catalytic slurry reactors may be appropriate.

The reactor includes means to introduce the reactants separately or through a common line, as in the case of gaseous reactants. In the case of liquids or gas-liquid reactants, one of the liquids may be introduced as a spray or mist. The product may be removed from the reactor, along with some of the liquid present in the reactor, the product separated from the liquid which can then be recycled back to the reactor. Any of the various known separation procedures may be used, as will be apparent to those skilled in the art.

In accordance with this invention, apparatus in the form of a reactor for chemical reactions is provided which is of a relatively simple configuration, and which, if operated in the manner herein described, provides increased reaction rates and/or specificity of reaction products. Referring further to FIG. 7, the reactor in its elemental form includes a reaction chamber 65 which may be cylindrical in shape and of any of the materials normally used in the construction of tower-type reactors. The reactor is provided with means to introduce reactants in the form of inlets 66 and 69, for countercurrent flow of the reactants, it being understood that concurrent flow of reactants may also be used by arranging the inlets, as is known in the art.

Positioned within the chamber 65 is a wetproofed catalyst bed 70. The catalyst may be any of the materials previously described, wetproofed to prevent flooding by either reactant or any liquid present in the reaction chamber. Optionally, the reactor may include a heat exchanger, not shown, operating to cool or heat the reactor, as may be desired, in zones or uniformly.

The reaction may be operated on a batch, batch continuous or continuous basis. Where operated continuously, means 67 and 68 are provided to remove products, and some reactant if necessary. The product may be separated in a separate operation and the residue reactant cycled back to the reactor. Optionally, screens 71 and 73 may be used to support and contain the catalyst bed 70.

Typical of the catalysts which may be used are carbon, activated carbon, nickel, titanium sponge, or a catalytically active or catalytically inactive substrate containing inclusions such as nickel, iron, cobalt, platinum, palladium, rhodium, and other platinum group metals, silver, gold-platinum alloy, manganese oxides (e.g., manganese dioxide), manganese sulfides, iron oxides or hydrated oxides, nickel oxide, nickel sulfide and cobalt sulfide or mixtures thereof. The support for the inclusions may be carbon, activated carbon, asbestos, silica, silica gel, alumina, ceramics, etc. Such supports may be catalytically active or inactive depending on the particular support used and the particular reactions involved. For example, a carbon support may be catalytically active in some instances and inactive in others. When a catalytically inactive support is used, catalysis is promoted by the catalytic inclusions contained on the support. The wetproofing of the support containing inclusions prevents flooding of the catalytic surfaces.

As a general rule, the carbon materials usable are those which do not have a predominantly graphitic structure, i.e., a form of carbon in which the atoms are oriented with respect to each other in a definite repetitive sequence. Usually, graphitic carbons are graphitized by heating a graphitizable form of carbon to temperatures above 2000° C and the process is essentially an annealing process which promotes the growth of graphite crystallites. Typically, artificial graphites are prepared by mixing particulate graphitizable carbon with a binder (coal or petroleum pitch) which itself forms graphitizable carbon when heated. Artificial graphites are normally used as electrodes and brushes for motors, and the like.

As noted previously, PTFE is a favored wetproofing agent. It may be deposited from solution, emulsion or dispersion in an amount of between 0.1 to 120% or greater by weight of the catalyst. The treated catalyst is then heated to remove the vehicle and dispersion agent for the PTFE. This heat treatment typically may be at temperatures over a broad range as long as it is sufficient to remove the carrier.

The wetproofing treatments for carbon which have already been mentioned are merely illustrative of the type of treatment possible. Other catalysts may be treated in a like manner. The wetproofing agent may be present on the catalyst in an amount of between 0.1% to 120% or in some instances even a greater percentage by weight of the catalyst. The wetproofing agent may be inert and hydrophobic or, in some cases, may be an active ingredient. For example, in a reaction system containing an organic liquid, such as benzene, and a polar liquid, such as water, the carbon is treated with polyvinyl alcohol or carboxy methyl cellulose (CMC). The polyvinyl alcohol or CMC is not a wetproofing agent, but rather being hydrophilic it attracts the polar liquid at such coated areas, the polar liquid in turn acting as a wetproofing agent to prevent the organic liquid from flooding the catalyst.

The following additional examples show the advantage of using a wetproofed catalyst.

EXAMPLE 26

Reduction of Nitric Oxide

A ⅜ inch diameter column was arranged with a sintered glass diffuser at the base and a 1/16 inch diameter top at the bottom for use in sample removal. The column was packed with various catalyst materials. Each batch of catalyst material was split into two parts, one of which was wetproofed with PTFE in amounts from 5% to 100% by weight of the original material, the other of which was not wetproofed.

After filling the column with the catalyst material and 50 ml. of 2M $H_2SO_4$, hydrogen was flowed through the column in a mixture of nitric oxide at the rate of 56 cc/minute hydrogen and 25 cc/minute nitric oxide. One cc. samples were analyzed for hydroxylamine every hour for three hours and ammonia content was determined at the end of three hours. Tollen's reagent was used as a confirming test, a black precipitate showing silver reducing power (i.e., hydroxylamine presence), a white or no precipitate showing no silver reducing power (i.e., lack of hydroxylamine production).

In the presence of buffers or acid neutralizing materials which raise the pH of the solution, nitrogen oxides, as well as hydroxylamine, may easily be reduced to ammonium salts or ammonia at high rates. At higher temperatures than about 60° C, a continuous decomposition reaction can be produced in which the reduction products react with nitrate to yield nitrous oxide or nitrogen gas and water. Generally speaking, the yield of hydroxylamine will suffer when the temperature is higher than about 60° C, although the reaction rates will increase between the nitrogen oxides and hydrogen.

| Reactor Packing | 5% Palladium on Carbon Powder | | 5% Palladium Carbon on Powder 50% $H_2O$ Wet | | 0.2% Palladium on Carbon Granules | | 5% Rhodium on Carbon Powder | |
|---|---|---|---|---|---|---|---|---|
| PTFE, % add on | 100 | — | 100 | — | 5.65 | — | 100 | — |
| Temp., °C at time elapsed | | | | | | | | |
| 0 hr. | 27 | 27 | 27 | 29 | 27 | 27 | 27 | 26 |
| 1 hr. | 52 | 25 | 54 | 25 | 32 | 24 | 59 | 25 |
| 2 hr. | 67 | 25 | 53 | 24 | 30 | 24 | 63 | 25 |
| 3 hr. | 67 | 25 | 54 | 25 | 28 | 25 | 65 | 25 |
| Tollen's Test | pos. | neg. | pos. | neg. | pos. | neg. | neg. | neg. |
| $NH_2OH$ as gm.N at time elapsed | | | | | | | | |

-continued

| Reactor Packing | 5% Palladium on Carbon Powder | 5% Palladium Carbon on Powder 50% H₂O Wet | 0.2% Palladium on Carbon Granules | 5% Rhodium on Carbon Powder |
|---|---|---|---|---|
| 1 hr. | 0.090 — | — — | 0.010 — | — — |
| 2 hr. | 0.150 — | 0.005 — | 0.015 — | — — |
| 3 hr. | 0.160 — | 0.005 — | 0.015 — | — — |
| NH₃ as gm.N/batch | 0.335  0.003 | 0.244  0.002 | 0.006  0.000 | 1.76  0.003 |

| Reactor Packing | 5% Platinum on Carbon Powder | 0.5% Platinum on Carbon Powder | 0.5% Platinum on Alumina Pellets | 0.5% Platinum added to Carbon Granules | 0.5% Platinum added to Carbon Granules |
|---|---|---|---|---|---|
| PTFE, % add on | 100 — | 5 — | 5 — | 5 — | 5 — |
| Temp., °C at time elapsed | | | | | |
| 0 hr. | 25  28 | 31  34 | 30  32 | 30  36 | 32  37 |
| 1 hr. | 53  25 | 58  27 | 31  28 | 57  29 | 59  31 |
| 2 hr. | 59  26 | 76  26 | 29  26 | 61  27 | 60  31 |
| 3 hr. | 63  27 | 75  25 | 28  26 | 62  27 | 56  30 |
| Tollen's Test | pos. at time elapsed  neg. | pos.  neg. | pos.  pos. | pos.  pos. | pos.  pos. |
| NH₂OH as gm.N | | | | | |
| 1 hr. | 0.100 — | 0.185 — | 0.080  0.015 | 0.030  0.005 | 0.100  0.008 |
| 2 hr. | 0.056 — | 0.190 — | 0.130  0.025 | 0.030  0.005 | 0.105  0.008 |
| 3 hr. | 0.010 — | 0.070 — | 0.170  0.028 | 0.020  0.005 | 0.070  0.008 |
| NH₃ as gm.N/batch | 1.644  0.022 | 1.357  0.003 | 0.148  0.005 | 1.212  0.006 | 1.226  0.003 |

EXAMPLE 27

Oxidation of Sulfide to Polysulfide Using Platinized Asbestos

As described earlier in this application, a wetproofed catalyst based on the use of platinized asbestos can be prepared. The following examples illustrate its use in the oxidation of sulfide to polysulfide.

Approximately one-half gram of 5% platinum on asbestos (PX 1268), obtained from Mathiason Scientific, a division of Will Ross, Incorporated, Cincinnati, Ohio), was wetproofed by placing a layer of 50 ml of toluene on a layer of water in a beaker, adding 0.1 grams of soluble polyethylene to the toluene, heating the beaker until the polyethylene dissolved, sprinkling the shredded asbestos over the toluene, removing the floating wetproofed asbestos from the water layer and drying the treated asbestos in an oven at 110° C for an hour. The wetproofed platinized asbestos was then tested by floating it on the surface of 50 grams of 2M sodium sulfide solution held at boiling temperature. After a period of five minutes, the sample of sulfide solution was analyzed. A control using the platinized asbestos without the wetproofing treatment was similarly tested. The analyses of the above test reactions were as follows:

| | % Platinum on Asbestos | |
|---|---|---|
| | Waterproof | Not Wetproofed |
| Sulfide Sulfur | 64.2 g/l | 65.1 g/l |
| Polysulfide Sulfur | 2.9 g/l | 0.0 g/l |
| Thiposulfate Sulfur | 0.0 g/l | 1.38 g/l |
| Sodium Hydroxide | 159.9 g/l | 167.1 g/l |

The previously described specific examples are only representative of the types of reactions which can be effectively promoted by use of a wetproofed catalyst. Not only is the present invention applicable to a large number of chemical reactions, but by following the principles of this invention, advantages accrue by maintaining the proper relation between the reactants and catalyst as herein described.

While the methods and forms of apparatus herein described constitute preferred embodiments of the invention, it is to be understood that the invention is not limited to these precise methods and forms of apparatus, and that changes may be made therein without departing from the scope of the invention which is defined in the appended claims.

What is claimed is:

1. Apparatus for conducting a thermodynamically spontaneous redox reaction, in which the free energy change is negative, between an aqueous fluid reductant reactant and air as a fluid oxidant reactant, said aqueous reductant reactant and said air forming an interface when in contact with each other, comprising
   a. a column reaction chamber for receiving said fluid reactants,
   b. a fixed bed of stationary solid catalyst particles positioned within said reaction chamber as a packing therein for catalyzing said reaction so as to produce reaction products,
      said solid catalyst particles being carbon particles having surface portions in contact with a hydrophobic substance consisting of polytetrafluoroethylene resin without being completely encapsulated by or encapsulating said hydrophobic material and resulting from treatment with from 0.1 to 100% by weight of carbon of said polytetrafluoroethylene resin, so as to prevent flooding of said catalyst particles by said aqueous fluid reactant and said solid catalyst particles being relatively free from chemical attack by said oxidant reactant, said reductant reactant and said reaction products,
   c. means to introduce said aqueous fluid reductant into the top of said reaction chamber and into contact with said solid catalyst particles positioned within said chamber without significantly agitating said catalyst particles,
   d. means to introduce said air into the top of said reaction chamber for concurrent downward flow with said aqueous reductant reactant and in contact with said solid catalyst particles without significantly agitating said catalyst particles thereby effecting the redox reaction, and
   e. means for recovering unreacted reactants and reaction products.

2. The apparatus of claim 1 wherein said catalyst particles are activated carbon particles which have been treated with approximately 5% by weight of carbon of a hydrophobic material consisting of polytetrafluoroethylene resin.

* * * * *